(12) United States Patent
Korcz et al.

(10) Patent No.: US 10,784,666 B2
(45) Date of Patent: Sep. 22, 2020

(54) BRACKET FOR ELECTRICAL DEVICES

(71) Applicant: Hubbell Incorporated, Shelton, CT (US)

(72) Inventors: Krzysztof Korcz, Granger, IN (US); Steven Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/917,049

(22) Filed: Mar. 9, 2018

(65) Prior Publication Data
US 2018/0261987 A1 Sep. 13, 2018

Related U.S. Application Data

(60) Provisional application No. 62/469,862, filed on Mar. 10, 2017.

(51) Int. Cl.
*H02G 3/12* (2006.01)
*H02G 3/08* (2006.01)

(52) U.S. Cl.
CPC ............ *H02G 3/125* (2013.01); *H02G 3/081* (2013.01)

(58) Field of Classification Search
USPC ....................................................... 248/27.1
See application file for complete search history.

(56) References Cited

U.S. PATENT DOCUMENTS

| | | | | |
|---|---|---|---|---|
| 4,723,746 A * | 2/1988 | Gould | .................... | H02G 3/105 174/58 |
| 4,964,525 A * | 10/1990 | Coffey | .................. | H02G 3/125 220/3.9 |
| 5,221,814 A * | 6/1993 | Colbaugh | ................ | H02G 3/14 174/58 |
| 5,405,111 A * | 4/1995 | Medlin, Jr. | ............ | H02G 3/125 248/205.1 |
| 5,516,068 A * | 5/1996 | Rice | ........................ | E04B 9/006 248/300 |
| 5,927,667 A * | 7/1999 | Swanson | .................. | H02G 1/00 174/54 |
| 6,376,770 B1 * | 4/2002 | Hyde | ...................... | H02G 3/123 174/50 |
| 6,666,419 B1 * | 12/2003 | Vrame | .................... | H02G 3/125 248/200.1 |
| 8,378,213 B1 * | 2/2013 | Gerardo | ................. | H02G 3/126 174/481 |
| 8,403,289 B1 * | 3/2013 | Rinderer | ................ | H02G 3/126 174/480 |
| 9,252,579 B2 * | 2/2016 | Korcz | .................... | H02G 3/081 |
| 2005/0067541 A1 * | 3/2005 | Dinh | ...................... | F16L 3/127 248/200 |
| 2005/0067546 A1 * | 3/2005 | Dinh | ...................... | H02G 3/125 248/343 |
| 2010/0006723 A1 * | 1/2010 | Yan | ........................ | H02G 3/125 248/201 |

(Continued)

*Primary Examiner* — Monica E Millner
(74) *Attorney, Agent, or Firm* — Michael Best & Friedrich, LLP

(57) ABSTRACT

A bracket for supporting at least one electrical device includes a first portion including a flange oriented in a first plane and at least one second portion including a leg oriented in a second plane substantially parallel to and offset from the first plane. Each second portion is configured to be coupled to the at least one electrical device.

20 Claims, 28 Drawing Sheets

(56) References Cited

U.S. PATENT DOCUMENTS

| | | | |
|---|---|---|---|
| 2012/0031640 A1* | 2/2012 | Korcz | H02G 3/086 |
| | | | 174/66 |
| 2014/0103180 A1* | 4/2014 | Birli | H02G 3/125 |
| | | | 248/274.1 |
| 2014/0263865 A1* | 9/2014 | Salian | H02G 3/121 |
| | | | 248/49 |
| 2016/0099555 A1* | 4/2016 | Nikayin | H02G 3/125 |
| | | | 248/74.2 |
| 2016/0241008 A1* | 8/2016 | Korcz | H02G 3/125 |
| 2016/0360629 A1* | 12/2016 | Witherbee | H02G 3/125 |
| 2017/0012421 A1* | 1/2017 | Terwilleger | H02G 3/125 |
| 2017/0256928 A1* | 9/2017 | Korcz | H02G 3/125 |
| 2019/0137031 A1* | 5/2019 | Johnson | H02G 3/12 |

* cited by examiner

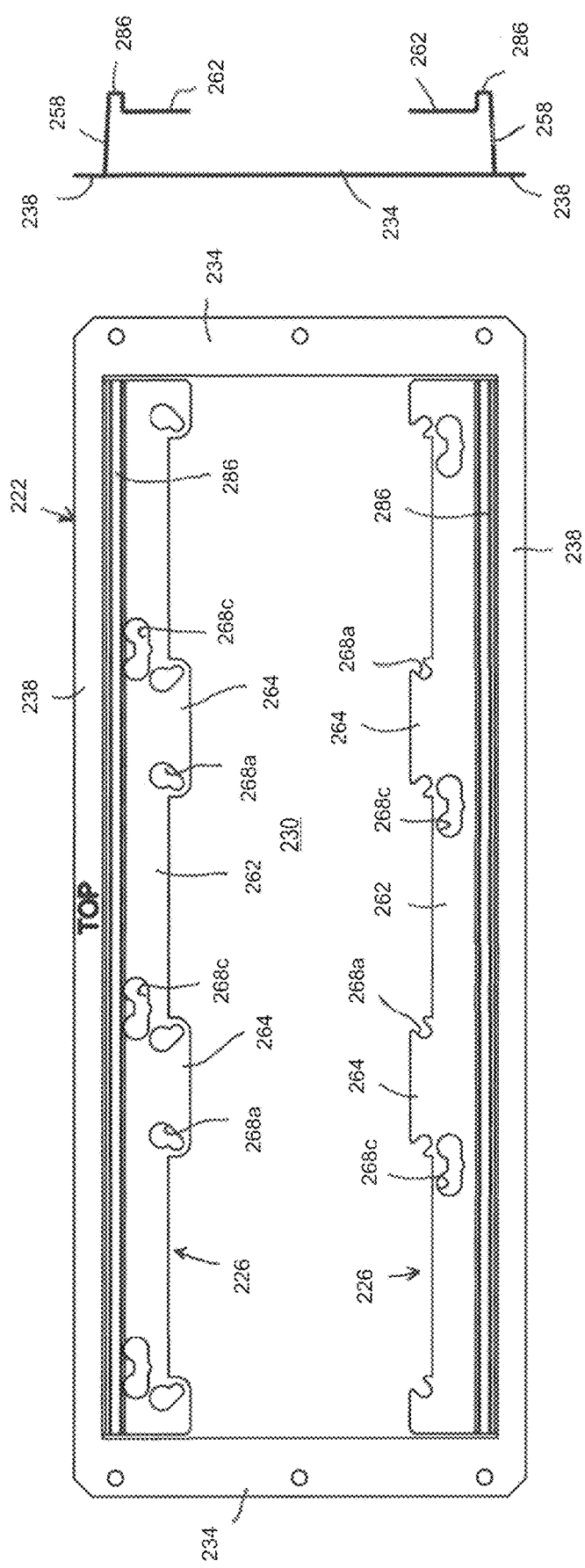
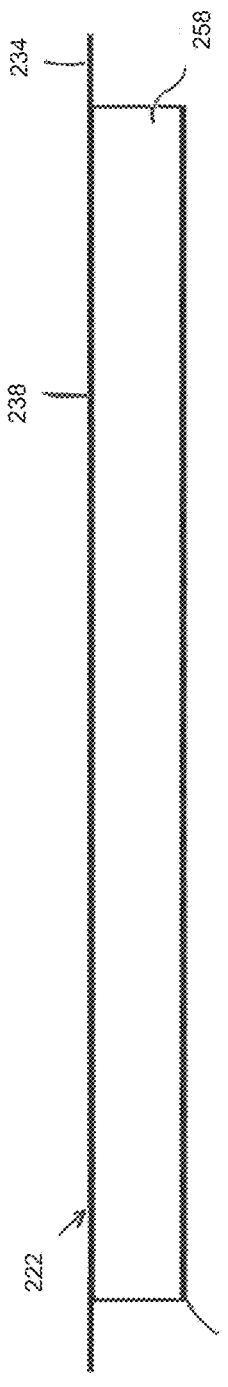
FIG. 16
FIG. 15
FIG. 17

BRACKET FOR ELECTRICAL DEVICES

CROSS-REFERENCE TO RELATED APPLICATION

This application claims the benefit of, prior-filed U.S. Provisional Patent Application No. 62/469,862, filed Mar. 10, 2017, the entire contents of which are incorporated by reference.

BACKGROUND

The present disclosure relates to mounting brackets, and particularly to mounting brackets for supporting electrical boxes and devices.

Electrical devices such as, but not limited to, electrical outlets, switches, and others are typically installed in a wall or ceiling. A gang or junction box may be secured to a stud or support beam inside of the wall or ceiling. The electrical device is then secured in the box in electrical communication with one or more electrical conductors so that the electrical device extends or protrudes from the wall or ceiling. Any exposed portions of the electrical conductor and its connection to the electrical device may be shielded within the box.

SUMMARY

In one aspect, a bracket for supporting at least one electrical device includes a first portion including a flange oriented in a first plane and at least one second portion including a leg oriented in a second plane substantially parallel to and offset from the first plane. Each second portion is configured to be coupled to the at least one electrical device.

In another aspect, a bracket for supporting at least one electrical device includes a first portion and at least one second portion. The first portion includes a flange extending between a first end and a second end, and the flange defines a central opening. The at least one second portion includes a leg connected to the first portion and extending at least partially between the first end and the second end. Each second portion provides multiple positions at which the at least one electrical device can be supported.

In yet another aspect, a bracket is provided for supporting at least one electrical device between a first support member and a second support member. The bracket includes a first end configured to be secured to a forward surface of the first support member, a second end configured to be secured to a forward surface of the second support member, a first portion, and at least one second portion. The bracket defines a longitudinal axis extending between the first end and the second end. The first portion includes a flange oriented in a first plane positioned proximate the forward surface of the first support member and the forward surface of the second support member. The first portion is positioned between the first end and the second end. The at least one second portion includes a leg oriented in a second plane. The leg is recessed relative to the first portion such that the second plane is substantially parallel to and offset from the first plane. The leg is configured to be coupled to the at least one electrical device.

The above-described and other features and advantages of the present disclosure will be appreciated and understood by those skilled in the art from the following detailed description and drawings.

BRIEF DESCRIPTION OF THE DRAWINGS

FIG. 15 is a plan view of the bracket of FIG. 14.
FIG. 16 is an end view of the bracket of FIG. 14.
FIG. 17 is a side view of the bracket of FIG. 14.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 7:
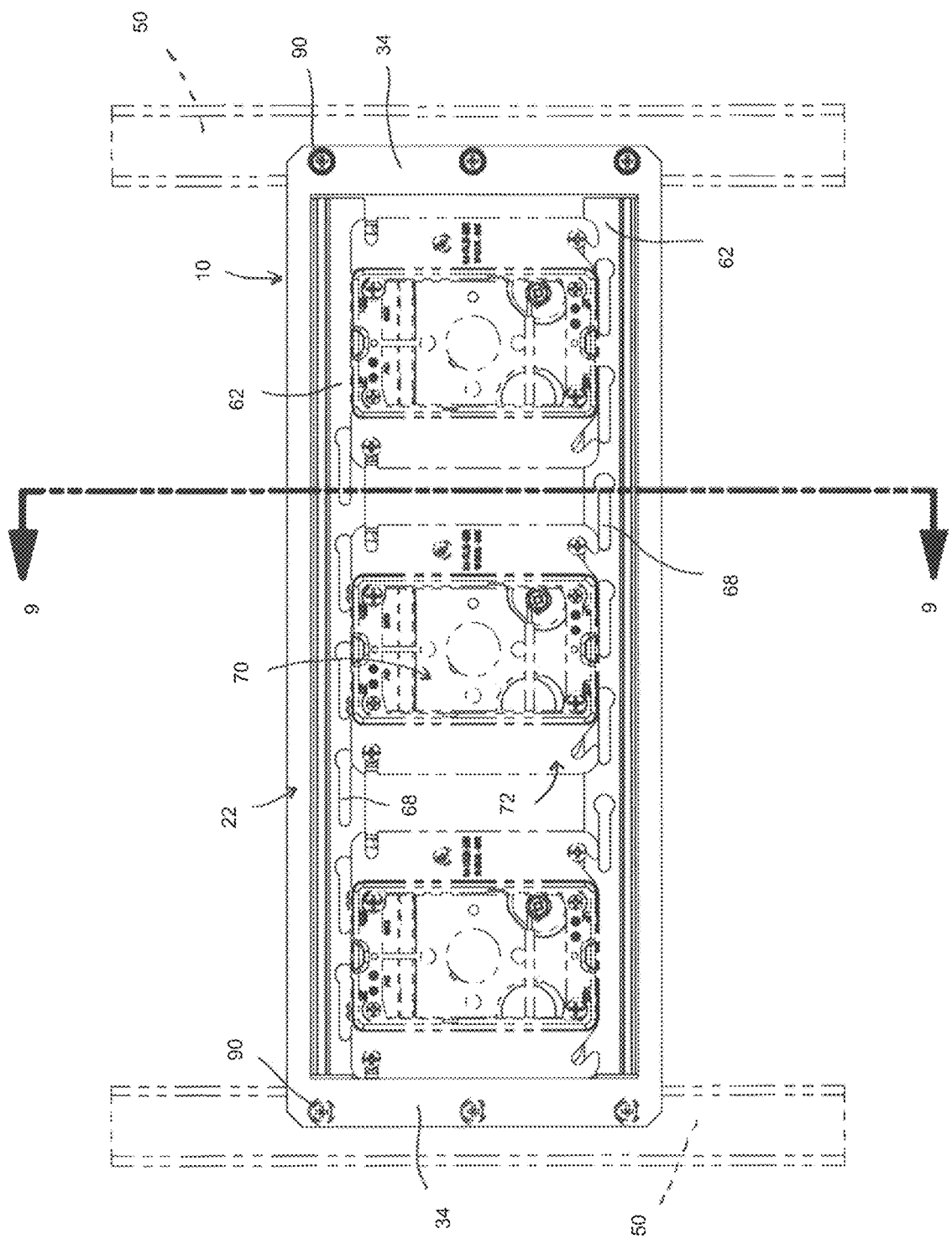
FIG. 7 is a plan view of the bracket of FIG. 1 supporting a plurality of electrical boxes and mud rings.

FIGS. 1-4 show a bracket 10 for supporting electrical devices. The bracket 10 includes an elongated first portion or flange 22, and a pair of second portions 26 connected to the flange 22. The flange 22 is oriented in a first plane and extends around an opening 30. In the illustrated embodiment, the flange 22 has a rectangular shape and includes a pair of end portions 34 and a pair of side portions 38 extending between the pair of end portions 34. Each end portion 34 may include holes 42 (FIG. 2) for coupling the flange 22 to a stud 50 (FIG. 7). A longitudinal axis 14 of the bracket 10 extends between the end portions 34.

Figure 1:
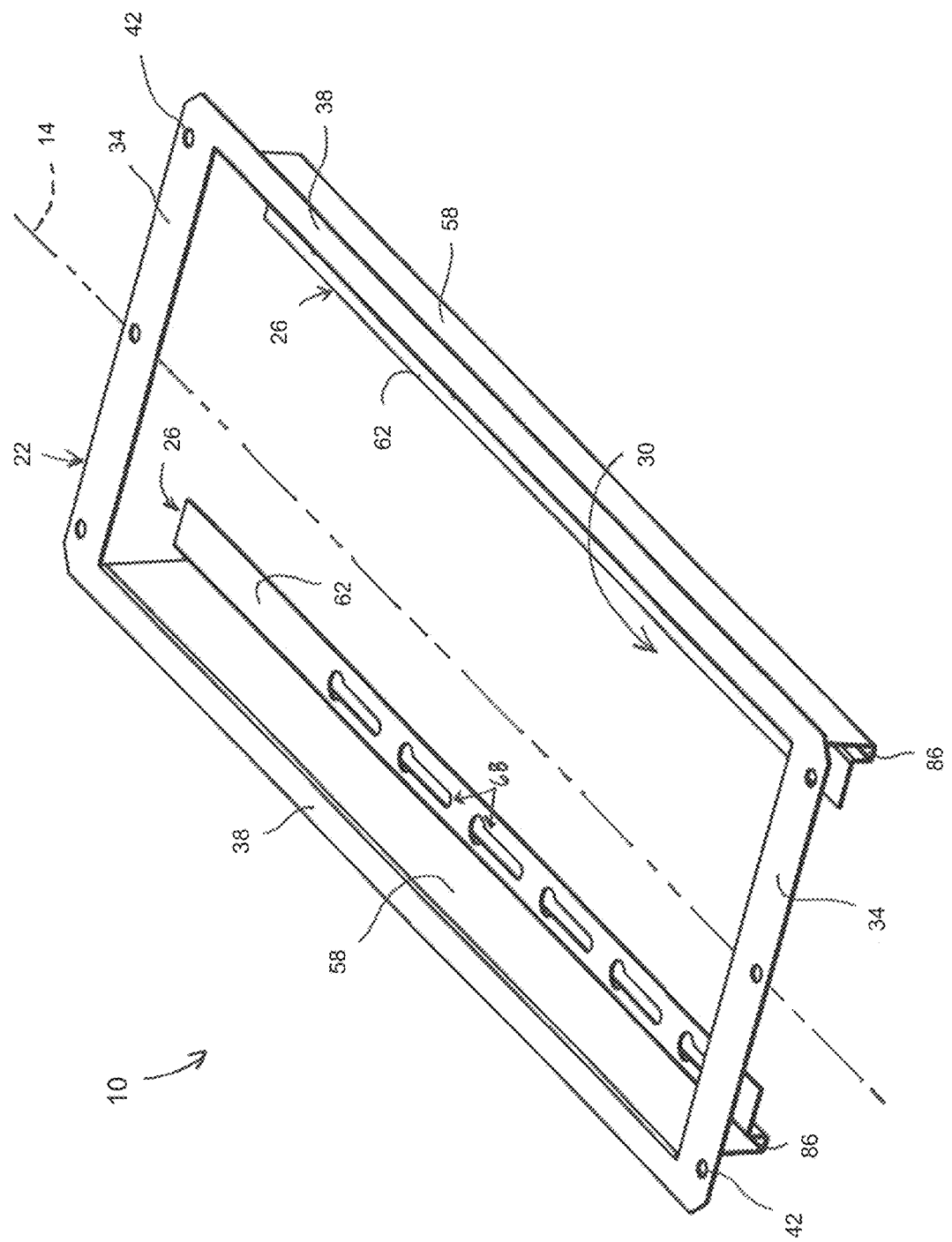
FIG. 1 is a perspective view of a bracket.
Figure 3:
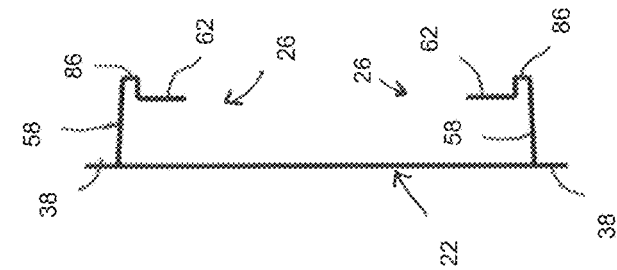
FIG. 3 is an end view of the bracket of FIG. 1.
Figure 2:
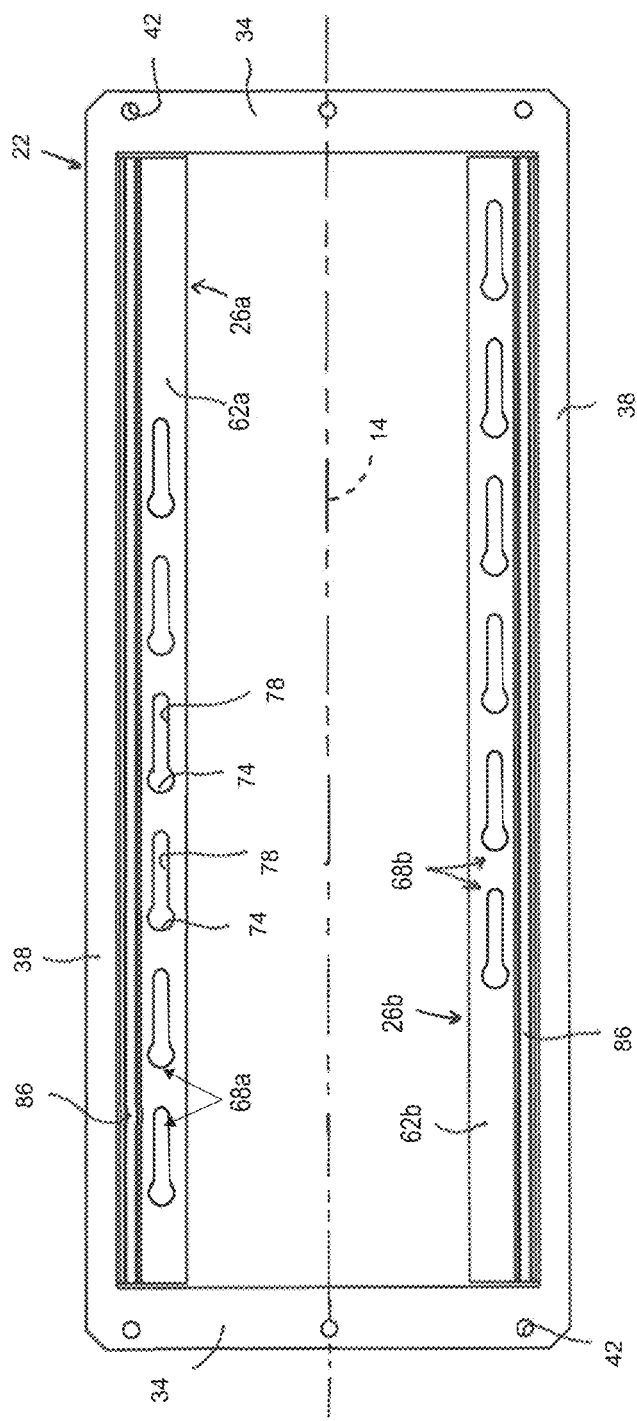
FIG. 2 is a plan view of the bracket of FIG. 1.
Figure 4:
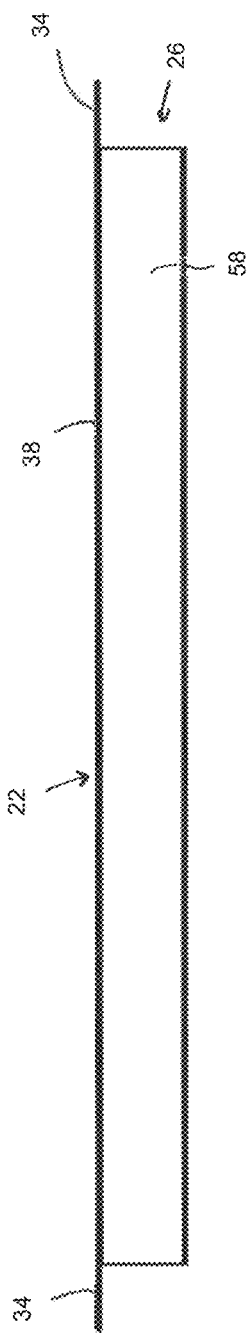
FIG. 4 is a side view of the bracket of FIG. 1.
Figure 6:
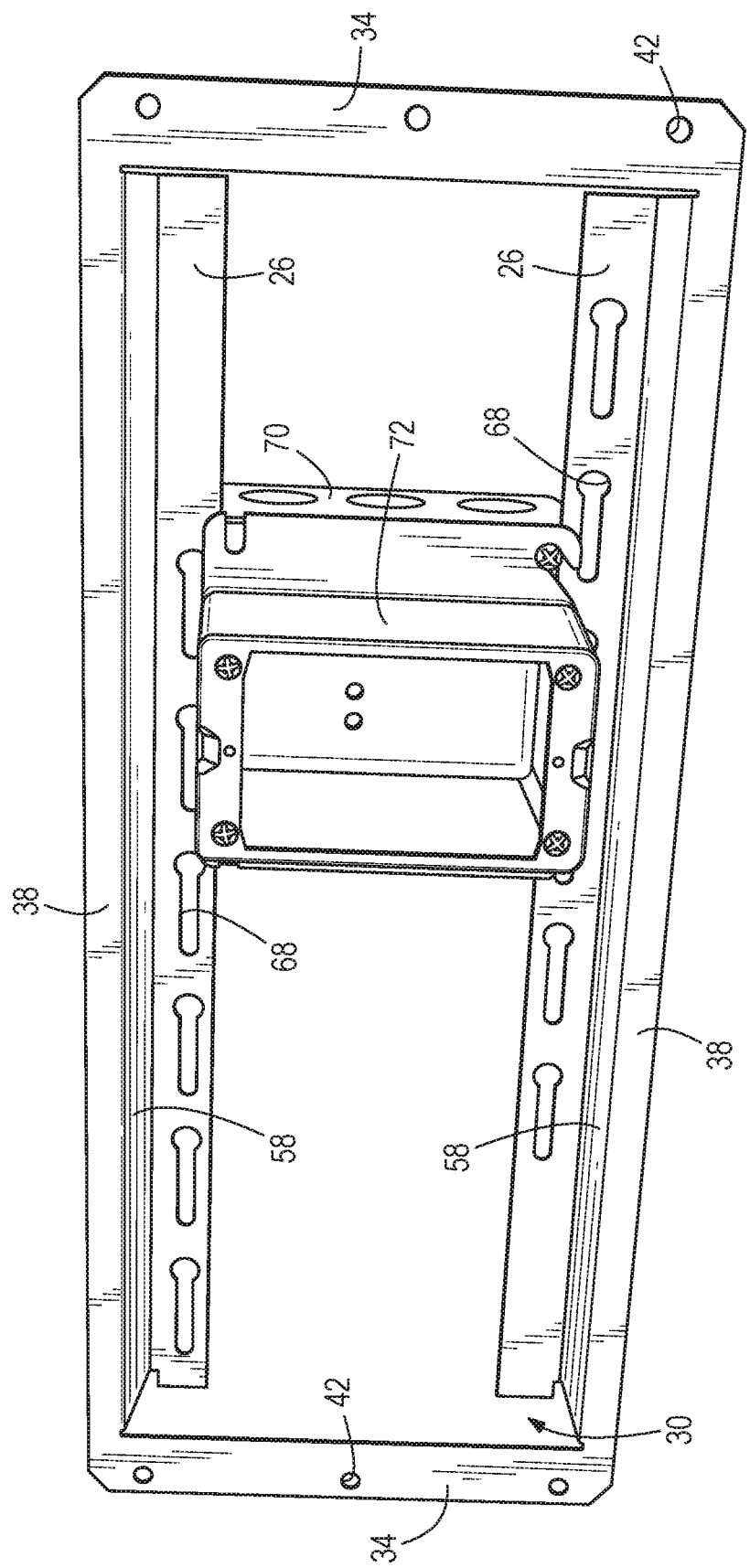
FIG. 6 illustrates a perspective of the bracket of FIG. 1 supporting an electrical box and a mud ring.

Each second portion 26 is positioned within the opening 30. The second portion 26 includes a first leg 58 connected to one of the side portions 38 of the flange 22 and a second leg 62 coupled to the first leg 58. As best shown in FIG. 3, the second legs 62 are oriented in a second plane offset from the first plane of the flange 10. Apertures 68 for mounting an electrical device (e.g., electrical box 70 and mud ring 72—FIG. 6) are formed on each second leg 62. As best shown in FIG. 2, the apertures 68 may be formed as keyhole apertures having a round hole 74 and an elongated slot 78 extending laterally from the round hole 74.

As shown in FIG. 2, in the illustrated embodiment the apertures 68 are aligned in a longitudinal direction and extend along a portion of the second leg 62 between the end portions 34 of the flange 22. One of the second portions 26a may include an aperture 68a positioned adjacent one of the flange end portions 34a, with the other apertures 68a positioned sequentially along a portion of the second leg 62a. The other second portion 26b may include an aperture 68b positioned adjacent the opposite end portion 34b of the flange 22, with the other apertures 68b positioned sequentially along a portion of the other second leg 62b, such that the apertures 68b extend from alternate end portions 34. The apertures 68 provide multiple positions at which an electrical box 70 and mud ring 72 may be attached.

Figure 5:
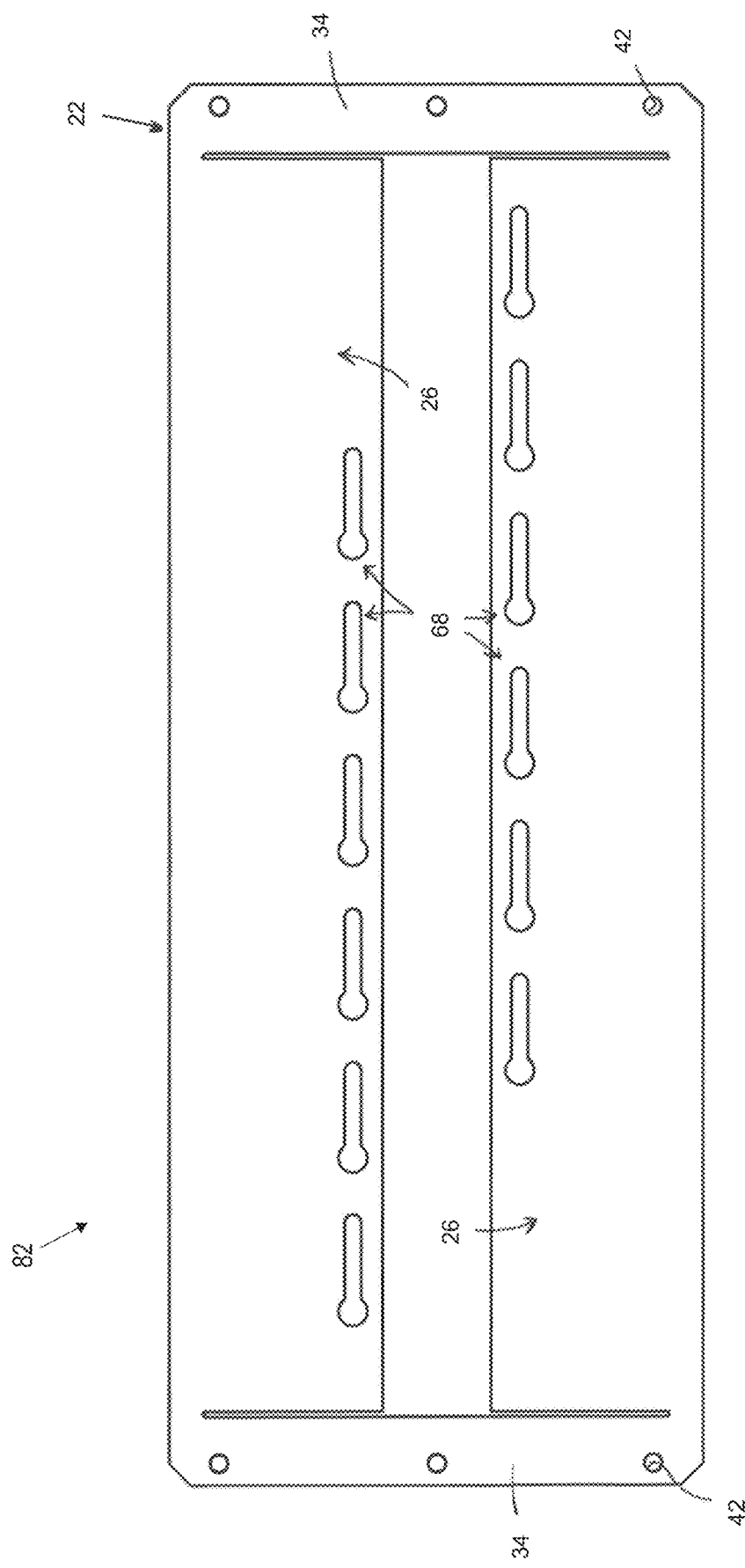
FIG. 5 is a plan view of a blank prior to forming the bracket of FIG. 1.

FIG. 5 shows a blank 82 before the bracket 10 is formed. The second portions 26 are initially formed coplanar with the flange 22 and are subsequently bent into the opening 30. In the illustrated embodiment, each second portion 26 is bent such that the second leg 62 is connected to the first leg 58 by a longitudinal channel 86 (FIG. 3) extending along the length of the second portion 26. The channel 86 provides additional rigidity. In some embodiments, the channel 86 also assists in centering or locating the electrical box 70 (FIG. 6) with respect to the bracket 10.

Figure 8:
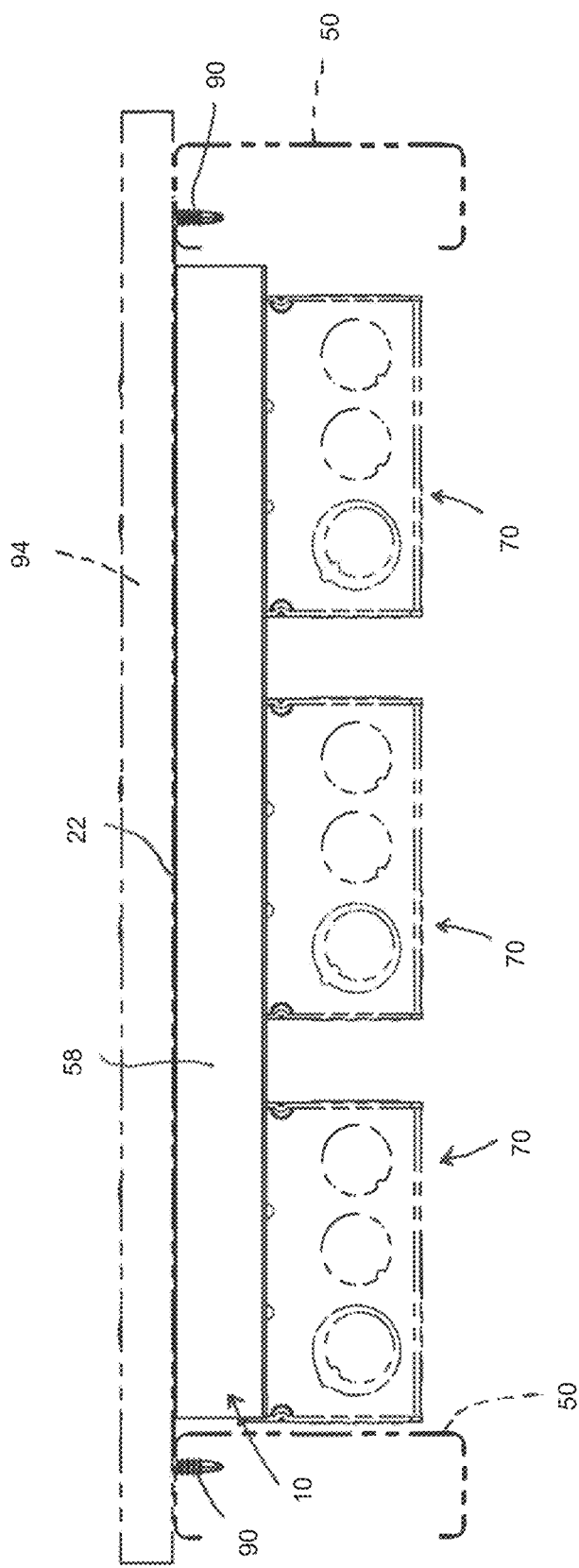
FIG. 8 is a top view of the bracket of FIG. 7.
Figure 9:
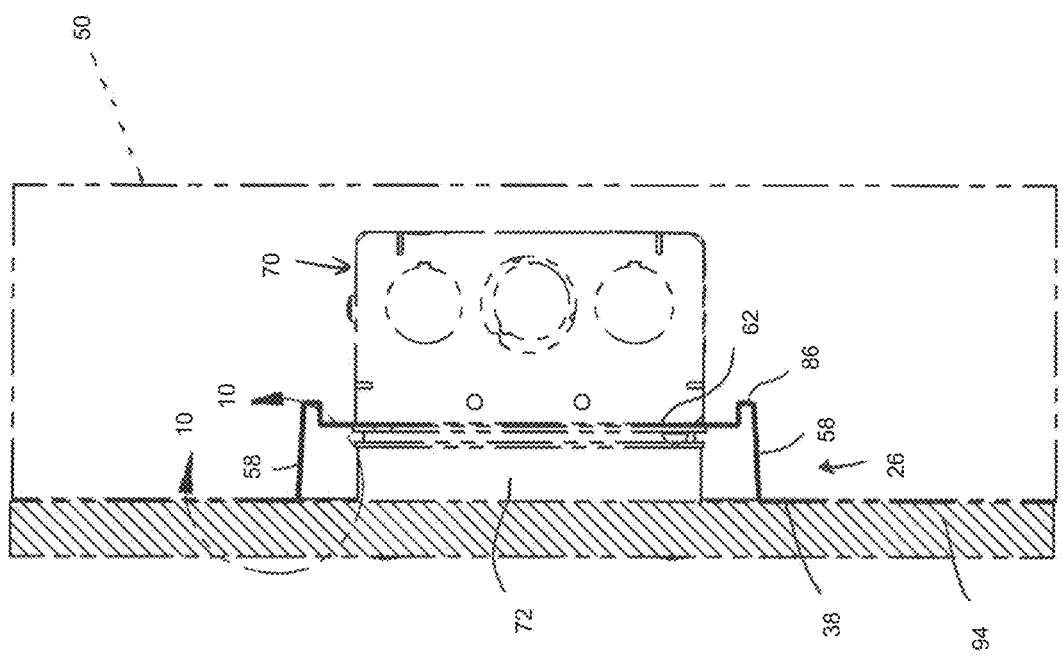
FIG. 9 is section view of the bracket of FIG. 7, viewed along section 9-9.

FIGS. 7-9 show the bracket 10 coupled between two support members or studs 50, and three electrical boxes 70 and three mud rings 72 are secured to the bracket 10 in multiple locations is understood that, in some embodiments, a different number of electrical boxes 70 and mud rings 72 may be secured to the bracket 10, and the electrical boxes 70 and mud rings 72 may be secured in other locations. That is, the boxes 70 and mud rings 72 may be secured to the bracket 10 at positions between the boxes 70 and mud rings 72 shown in FIG. 7.

Figure 10:
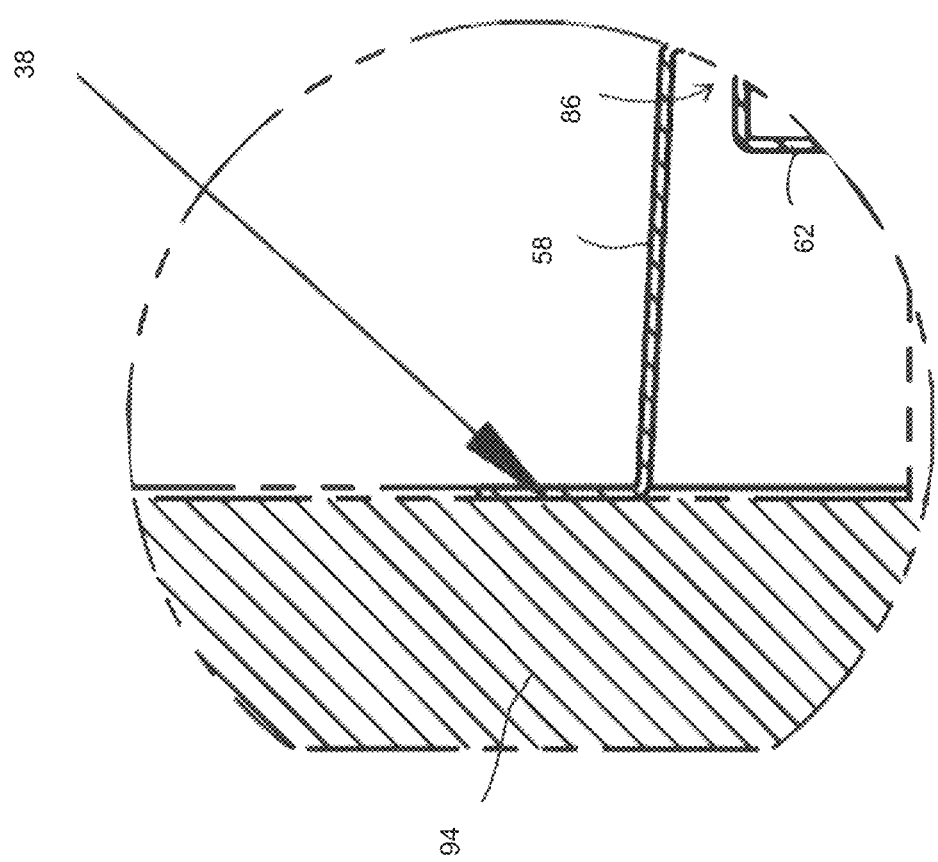
FIG. 10 is an enlarged side view of portion 10-10 of FIG. 9.

In the illustrated embodiment, fasteners 90 extend through the holes 42 in each flange end portion 34 and into one of the studs 50. As shown in FIGS. 9 and 10, the end portions 34 are positioned between the studs 50 and a wall material 94 (e.g., drywall FIGS. 8 and 9). Electrical boxes 70 (FIG. 8) are positioned adjacent one side (e.g., a rear side) of the second portion 26, and mud rings 72 (FIG. 7) are positioned adjacent an opposite or forward side of the second portion 26. In the illustrated embodiment, the electrical boxes 70 are secured to the second portion 26 via fasteners 98 clamping onto an edge of the second leg 62. The offset between the plane of the second legs 62 and the plane of the flange 22 allows the mud rings 72 to be recessed relative to the wall 94, so that a front face of the mud ring 72 is positioned at a desired depth relative to the outer surface of the wall 94. In the illustrated embodiment, the box 70 is a 4-inch box.

Figure 11:
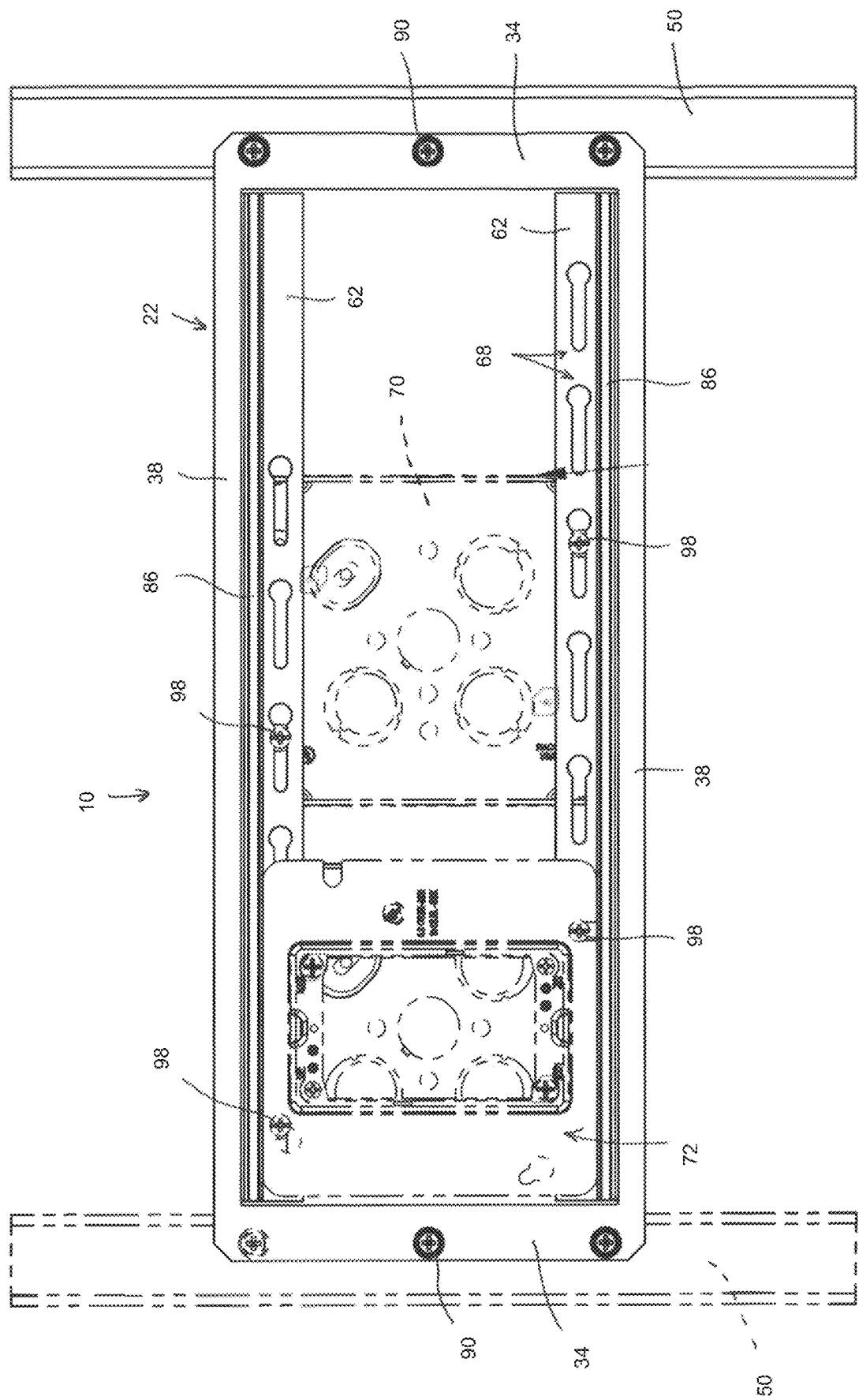
FIG. 11 is a plan view of the bracket of FIG. 1 supporting a plurality of electrical boxes and a mud ring.
Figure 12:
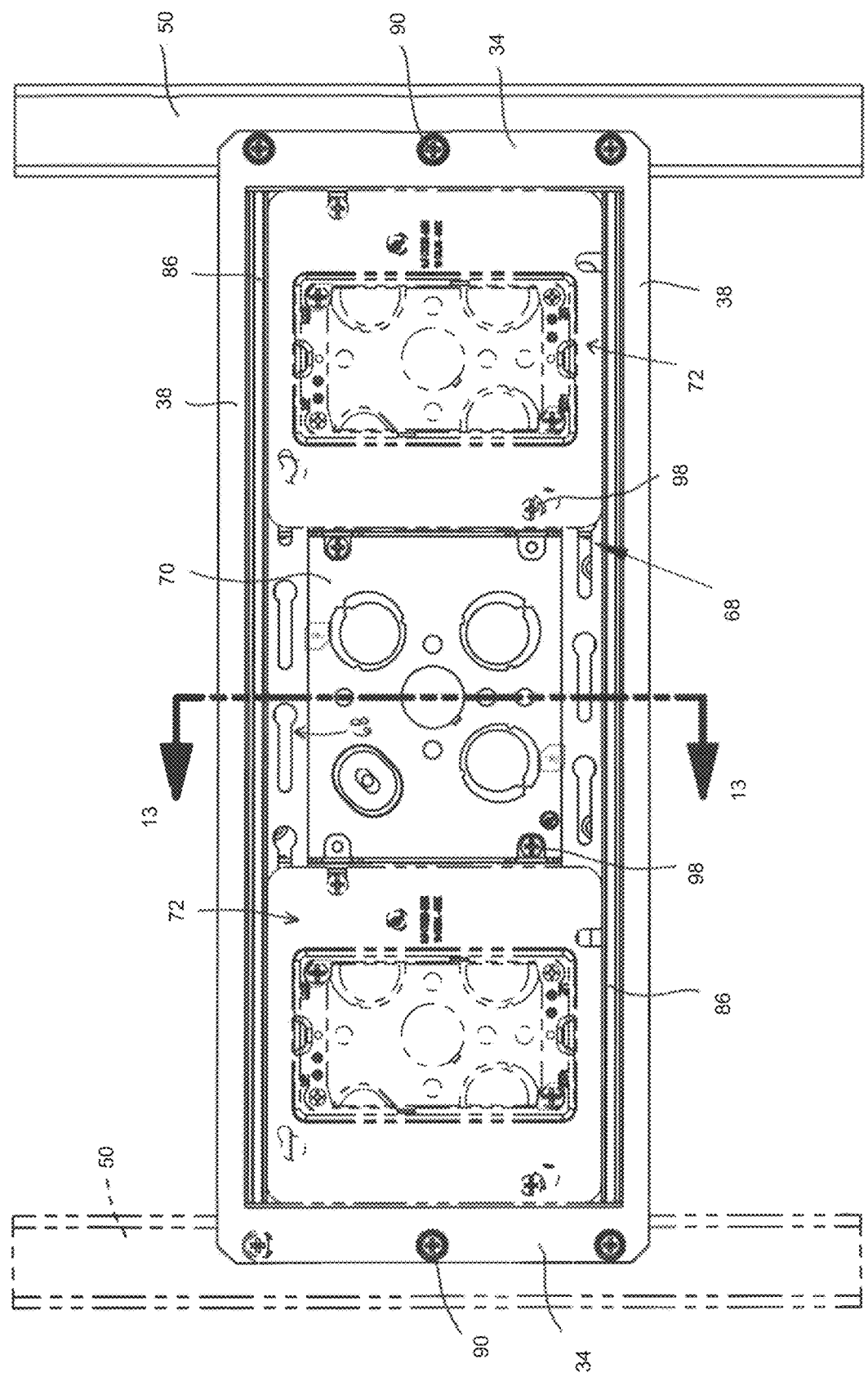
FIG. 12 is a plan view of the bracket of FIG. 1 supporting a plurality of electrical boxes and a plurality of mud rings.
Figure 13:
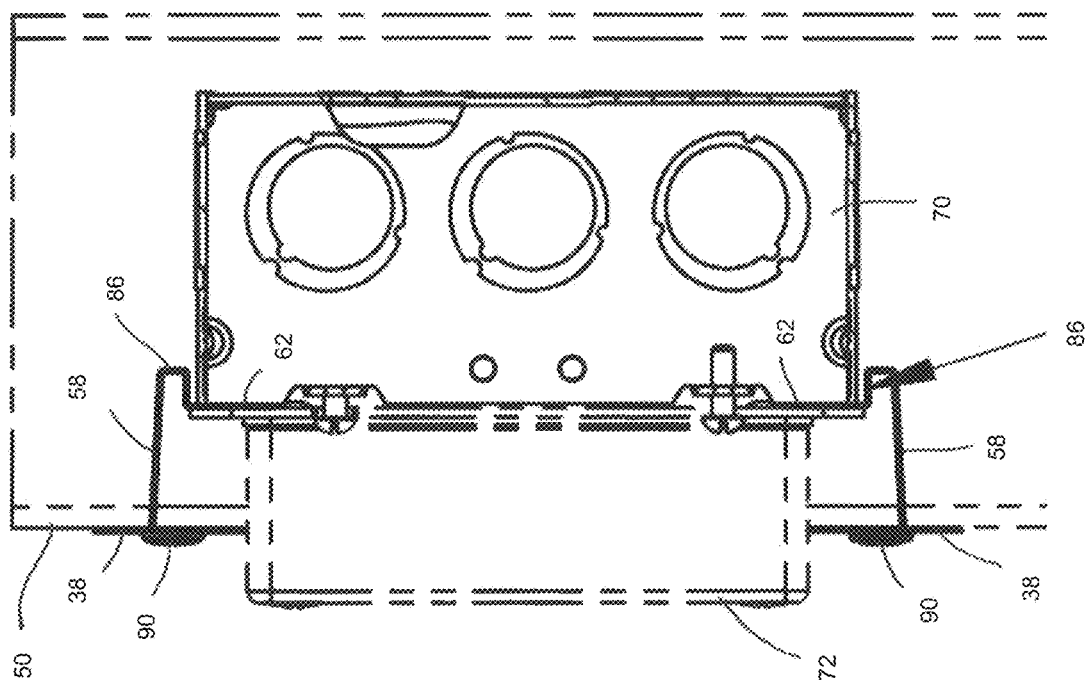
FIG. 13 is a section view of the bracket of FIG. 12 viewed along section 13-13.

FIG. 11 illustrates another embodiment in which each electrical box 70 is secured to the second portion 62 by fasteners 98 extending through the apertures 68 of the second legs 62. The fasteners 98 may be inserted through the round hole 74 of the mounting apertures 68 and then slid along the elongated slot 78 until the electrical box 70 is in a desired position. FIGS. 12 and 13 illustrate another embodiment in which each mud ring 72 is secured to one of the electrical boxes 70 by fasteners 98 (e.g., box screws) extending through the opening 30 of the bracket 10. The fasteners 98 are tightened such that the boxes 70 and mud rings 72 are clamped onto opposite sides of the second leg 62. As shown in FIG. 13, the channel 86 assists in centering each electrical box 70 in a vertical direction (i.e., aligning the electrical box 70 with a longitudinal axis of the bracket 10). In the embodiment shown in FIG. 13, the box 70 is a 4 11/16" box.

FIGS. 14-17 illustrate a bracket 210 according to another embodiment. The bracket 210 is similar to the bracket 10 described above with respect to FIGS. 1-13, and for the sake of brevity only differences are described herein. Similar features are identified with similar features, plus 200.

Figure 14:
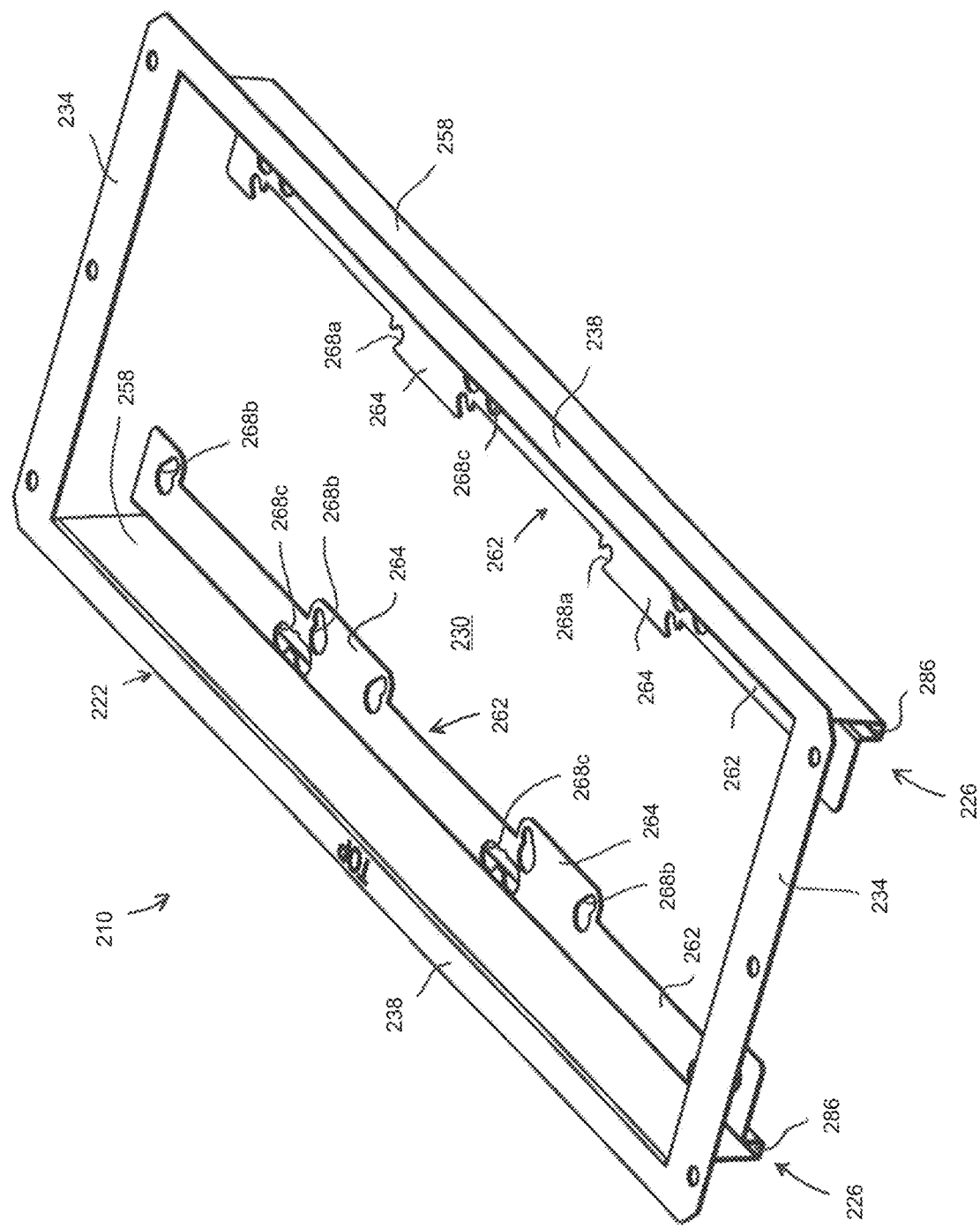
FIG. 14 is a perspective view of a bracket according to another embodiment.

As shown in FIGS. 14 and 15, each second leg 262 includes tabs 264 extending into the opening 230. In addition, the bracket 210 includes apertures 268 having various shapes. For example, some mounting apertures include opened ended slots 268a formed along edges of tabs 264 on one of the second portions 226, and keyhole slots 268b formed at an angle relative to tabs 264 on an opposite side of the bracket 210. Additionally, joined mounting apertures 268c may be formed on each second leg 262 and may be formed as two key hole slots positioned in mirrored relationship in which the elongated slot portions are joined to one another.

Figure 18:
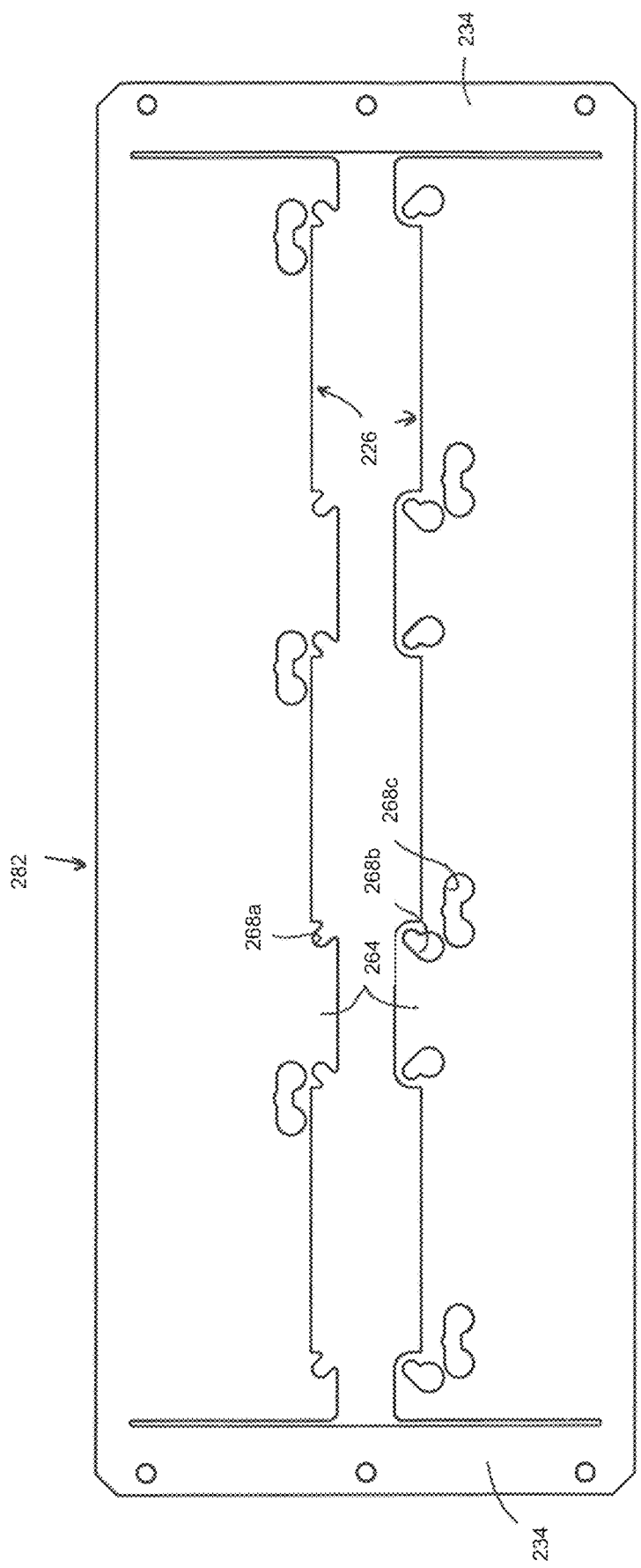
FIG. 18 is a plan view of a blank prior forming the bracket of FIG. 14.

FIG. 18 shows a blank 282 before the bracket 210 is formed. The second portions 226 are initially formed coplanar with the flange 222 and are subsequently bent into the opening 230. Each second portion 226 is bent such that a second leg 262 is connected to a first leg 258 by a longitudinal channel 286 (FIG. 16) extending along the length of the second portion 226. The channel 286 provides additional rigidity and assists in locating the electrical boxes 70 (FIGS. 20 and 21) and mud rings 72 along a centerline of the bracket 210.

Figure 19:
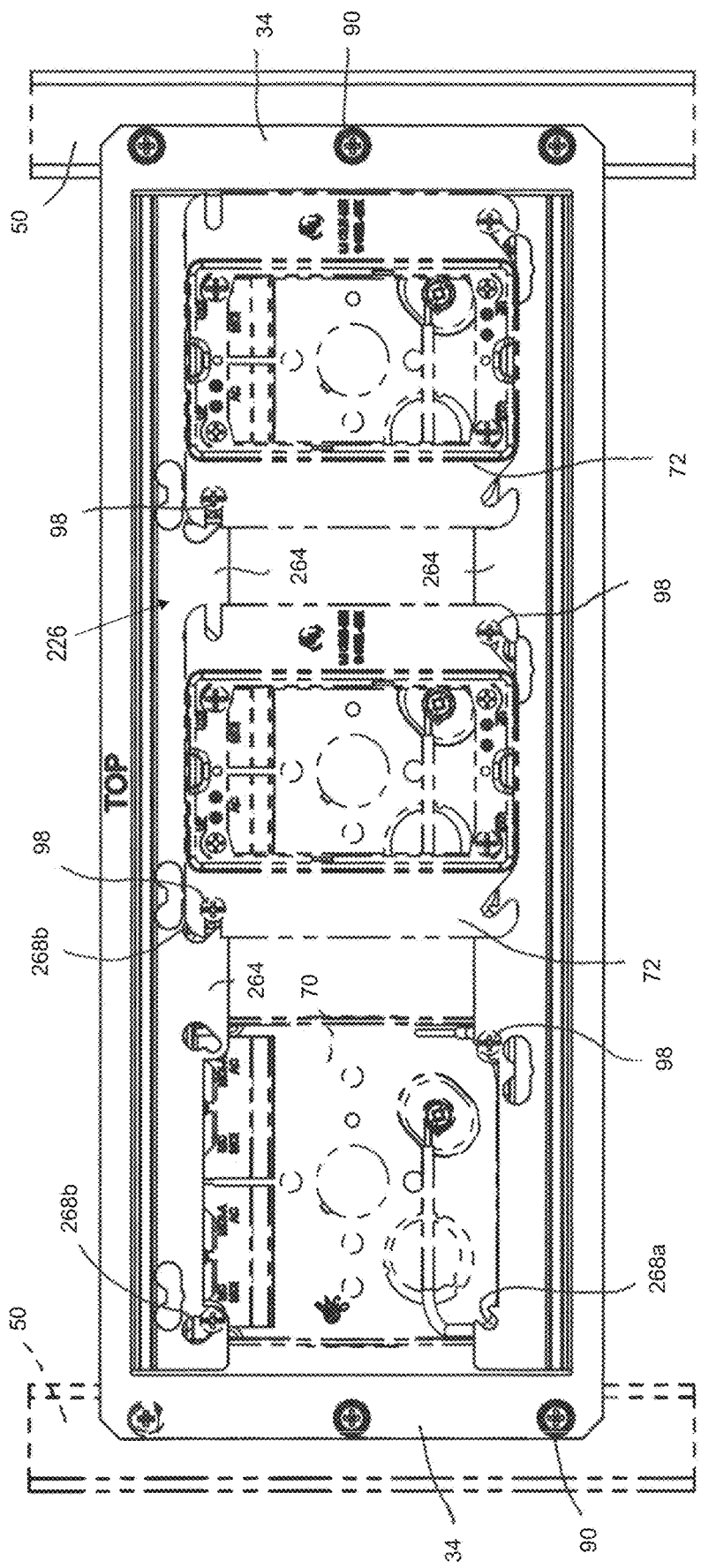
FIG. 19 is a plan view of the bracket of FIG. 14 supporting a plurality of electrical boxes and mud rings.
Figure 20:
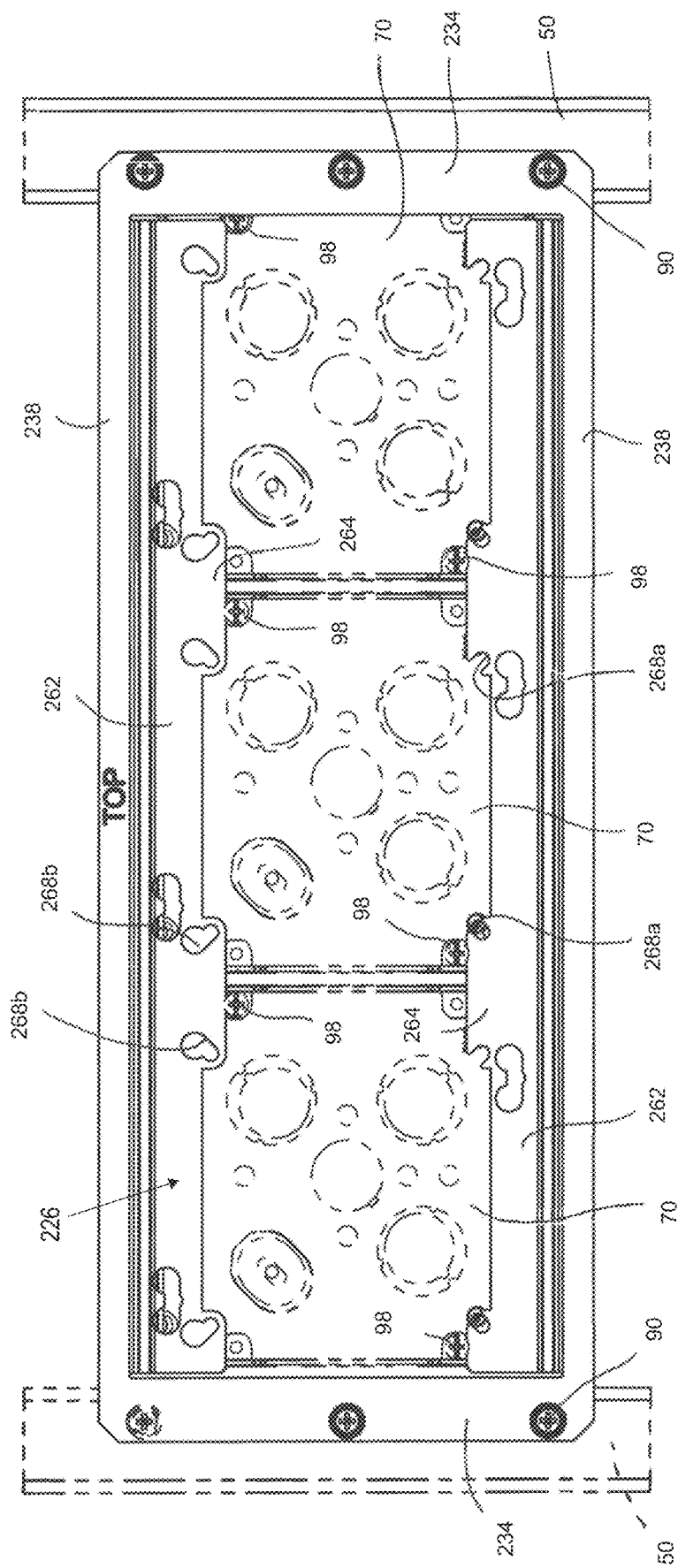
FIG. 20 is a plan view of the bracket of FIG. 14 supporting a plurality of electrical boxes.
Figure 21:
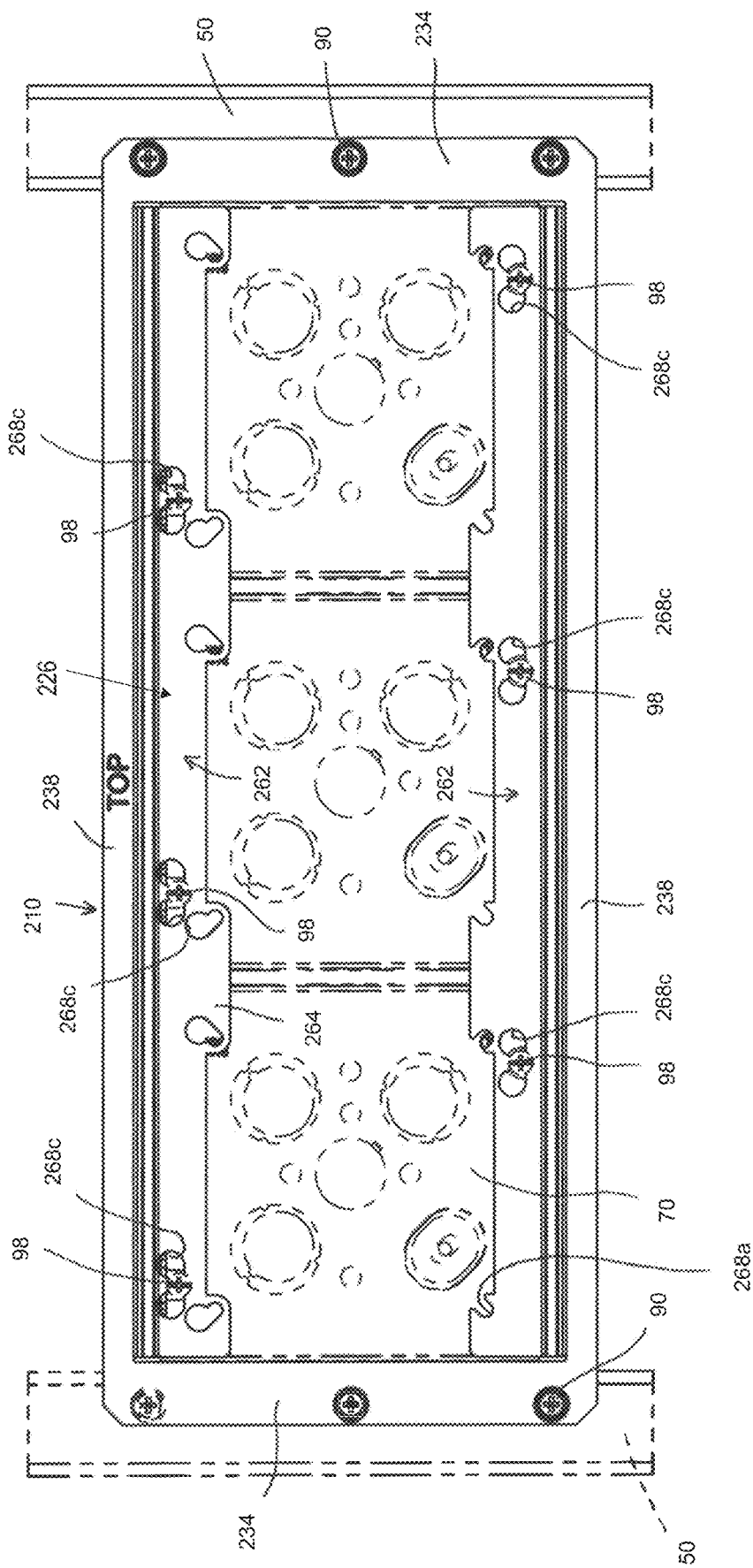
FIG. 21 is a plan view of the bracket of FIG. 14 supporting a plurality of electrical boxes.

FIG. 19 illustrates the bracket 210 coupled between two studs 50. Electrical boxes 70 and mud rings 72 are secured to the bracket 210 in multiple locations. The boxes 70 and mud rings 72 may be coupled to one another by one or more fasteners 98, and threading the fasteners may cause the boxes 70 and mud rings 72 to clamp or exert a compressive force on the second portion 226. In some embodiments, the fasteners 98 may engage at least an edge of the second portion 226. In some embodiments, the apertures 268 may provide multiple fixed or discrete positions at which the box 70 and mud ring 72 may be secured. In the illustrated embodiment, the electrical boxes 70 are secured by fasteners 98 extending through the slots 268*a*, 268*b* formed on the tabs 264, and the mud rings 72 are secured via the same fasteners 98. FIG. 20 shows the electrical boxes 70 secured to the second portion 226 by fasteners 98 (e.g., screws) extending through a center of the bracket 210. FIG. 21 shows the electrical boxes 70 secured to the second portion 226 by fasteners 98 (e.g., screws) extending through the joined mounting apertures 268*c*.

FIGS. 22-26 illustrate a bracket 410 according to another embodiment. The bracket 410 is similar to the bracket 10 described above with respect to FIGS. 1-13, and for the sake of brevity only differences are described herein. Similar features are identified with similar features, plus 400.

Figure 22:
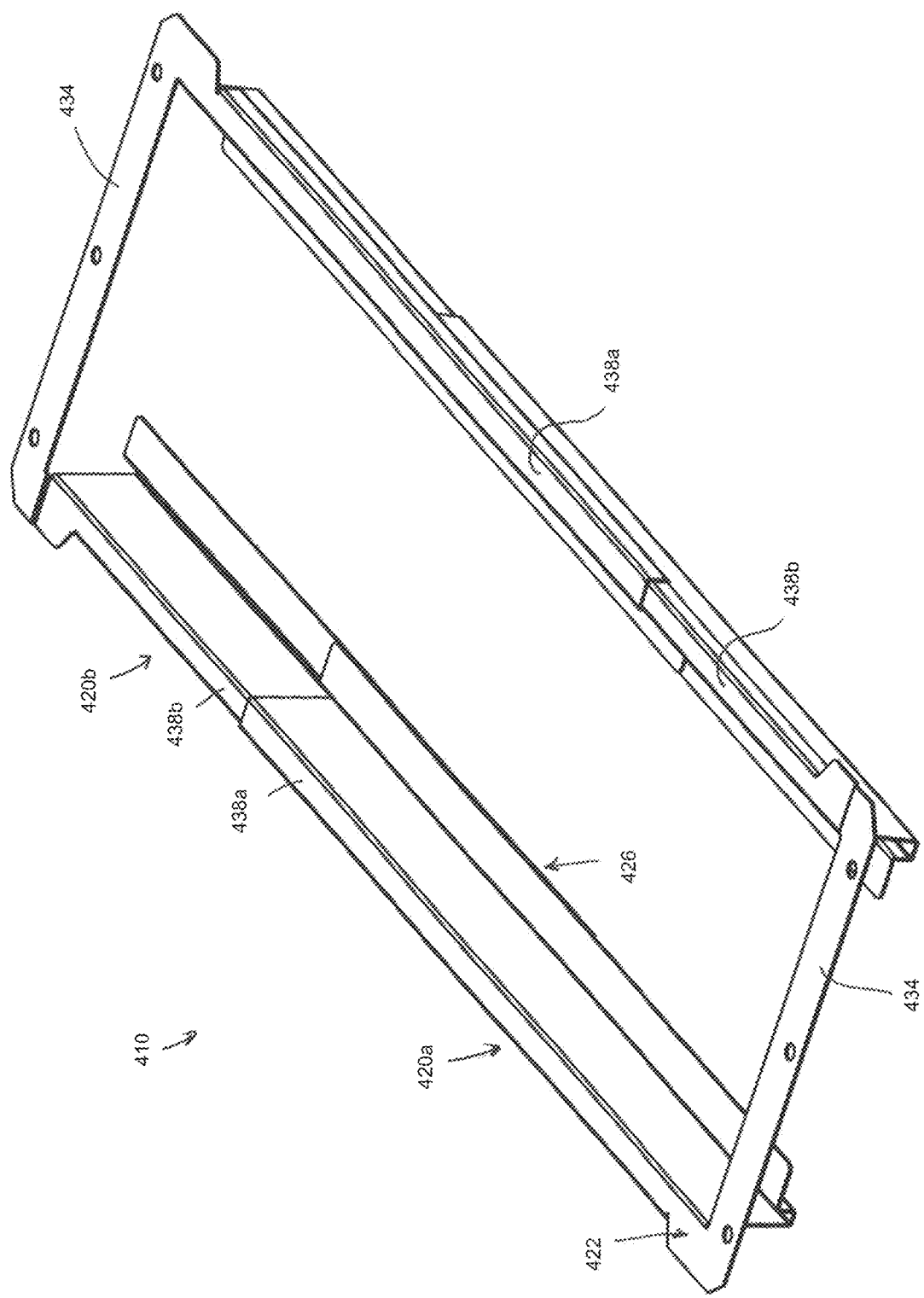
FIG. 22 is a perspective view of a bracket according to another embodiment.
Figure 24:
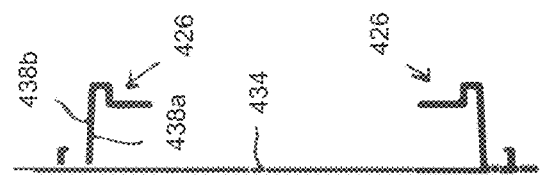
FIG. 24 is an end view of the bracket of FIG. 22.
Figure 23:
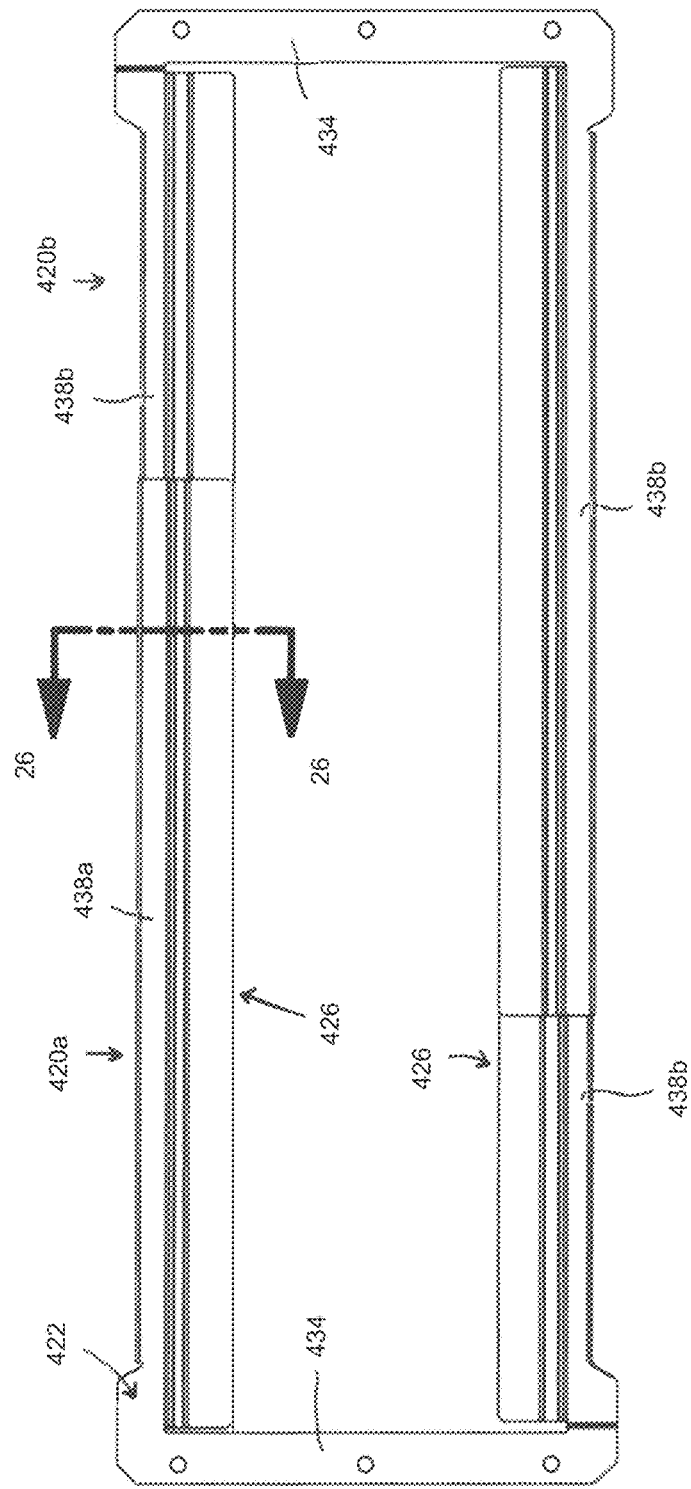
FIG. 23 is a plan view of the bracket of FIG. 22.
Figure 25:
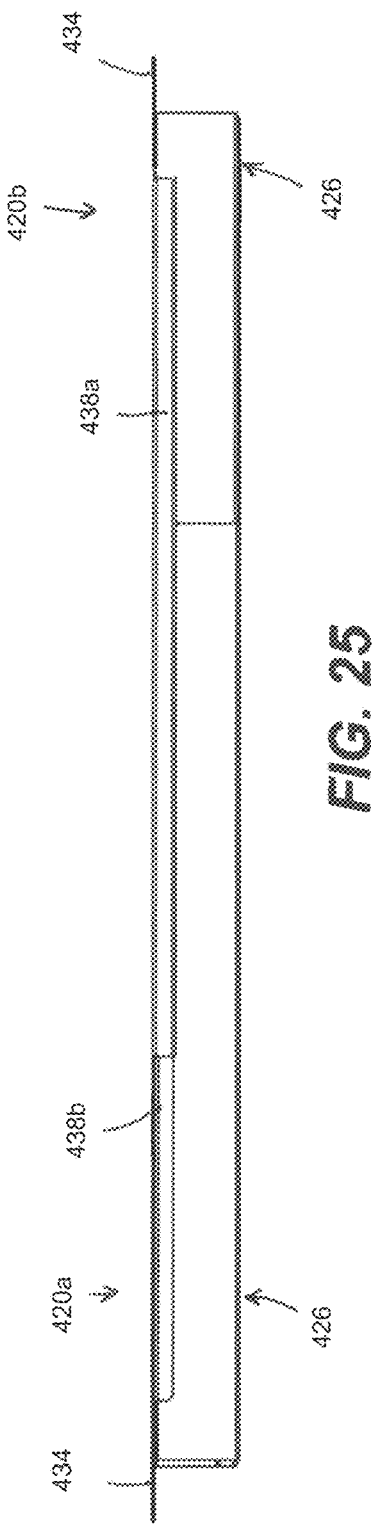
FIG. 25 is a side view of the bracket of FIG. 22.
Figure 26:
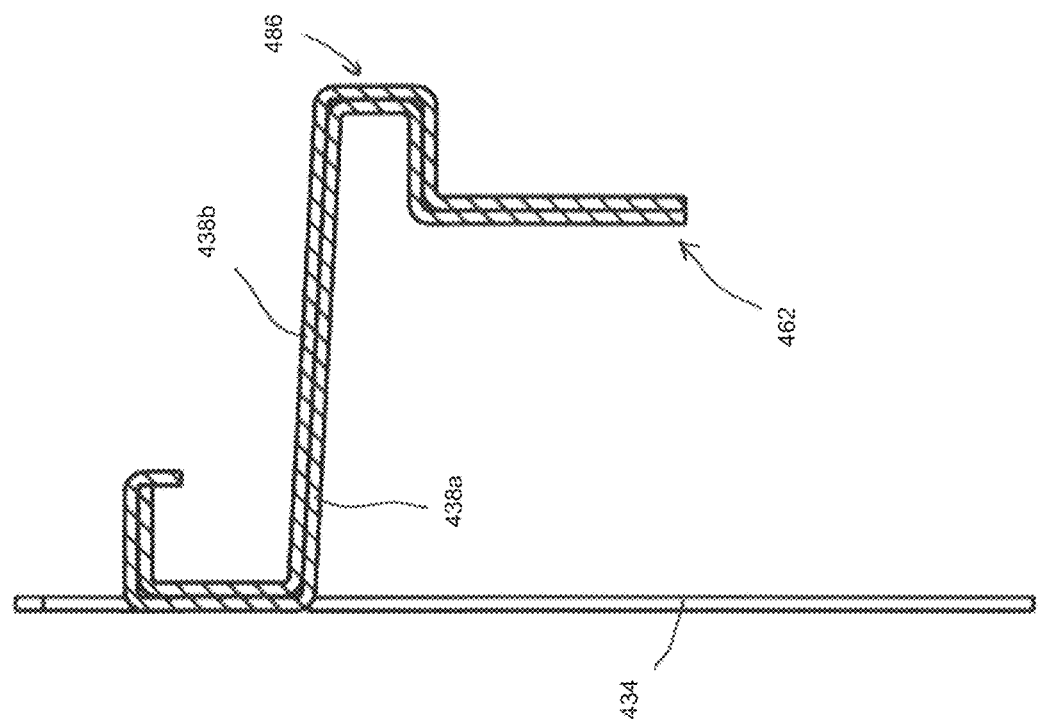
FIG. 26 is a section view of the bracket of FIG. 22 viewed along section 26-26.
Figure 28:
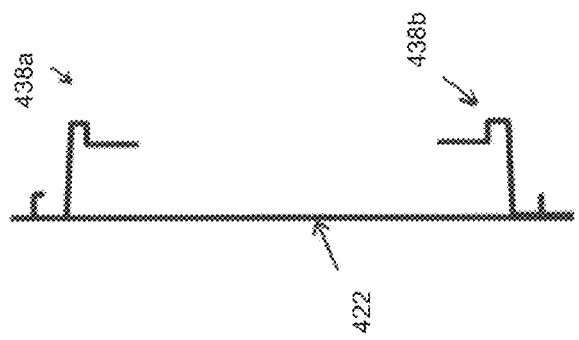
FIG. 28 is an end view of a portion of the bracket of FIG. 22.
Figure 27:
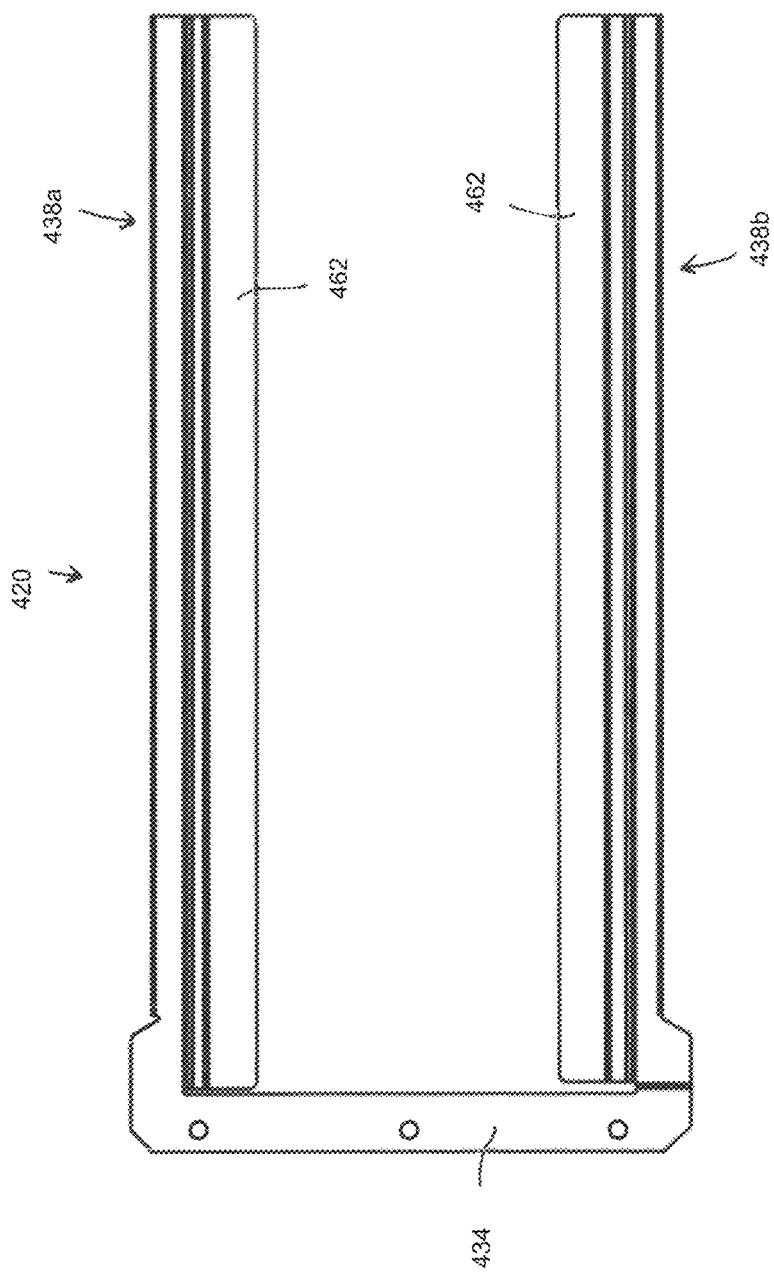
FIG. 27 is a plan view of a portion of the bracket of FIG. 22.

As shown in FIGS. 22 and 23, the bracket 410 is formed as two separate members 420*a*, 420*b* slidably engaging one another. In the illustrated embodiment, the side portions 438 of the flange 422 and the second portions 426 of each member 420*a*, 420*b* overlap the side portions 438 and second portions 426 of one another and permit sliding movement relative to one another. One side portion 438*a* of the first member 420*a* is received within an associated side portion 438*b* of the second member 420*b*, while the other side portion 438*b* of the first member 420*a* receives the other side portion 438*b* of the second member 420*b*. The slidable connection between the members 420*a*, 420*b* permits the length of the bracket 410 to be adjusted to accommodate varying distances between adjacent studs. As shown in FIGS. 27 and 28, in the illustrated embodiment, the members 420*a*, 420*b* are identical to each other. Although not shown in FIGS. 22-28, the second portion 426 of each member 420*a*, 420*b* may include apertures for securing electrical boxes and mud rings to the bracket 410.

FIGS. 29-32 illustrate a bracket 610 according to another embodiment. The bracket 610 is similar to the bracket 10 described above with respect to FIGS. 1-13, and for the sake of brevity only differences are described herein. Similar features are identified with similar features, plus 600.

Figure 29:
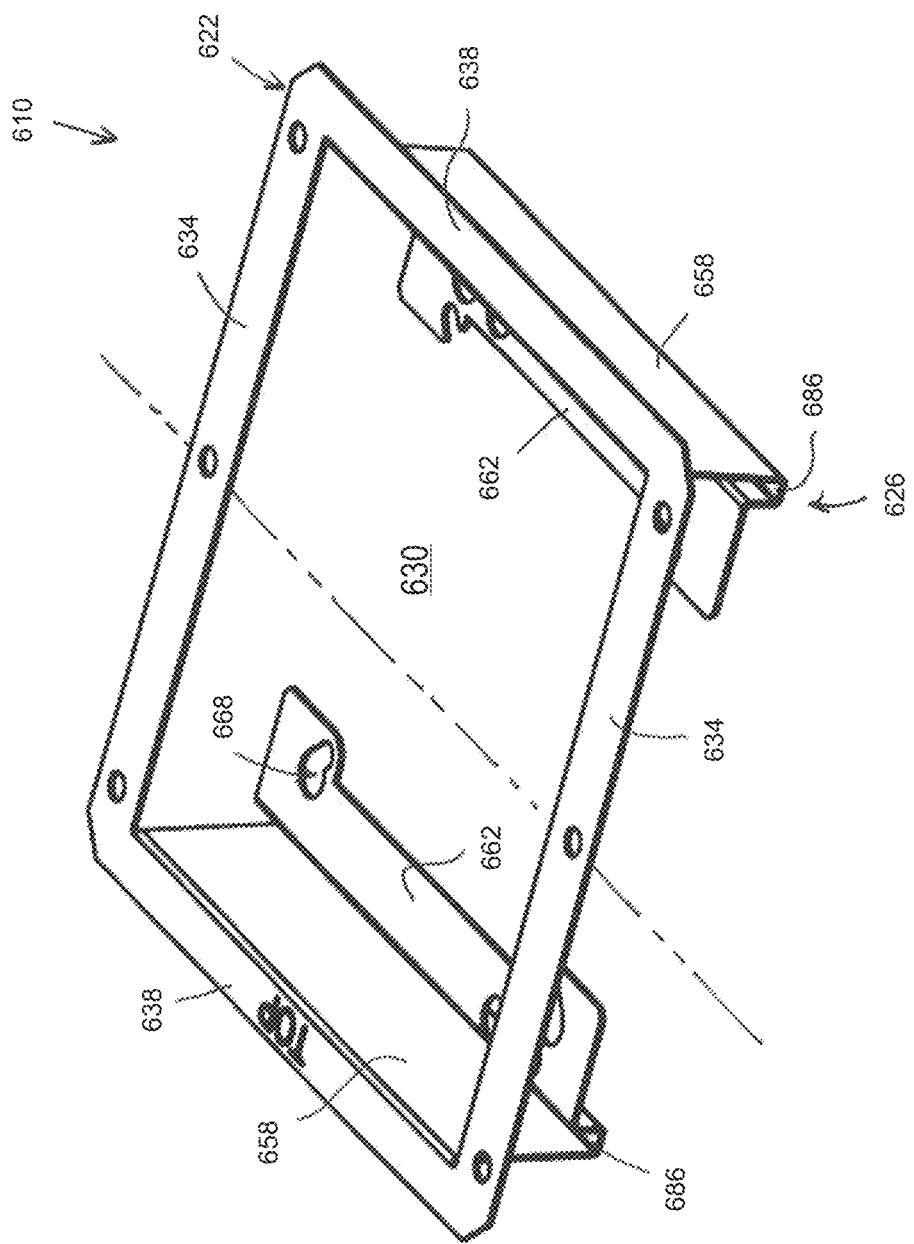
FIG. 29 is a perspective view of a bracket according to another embodiment.
Figure 31:
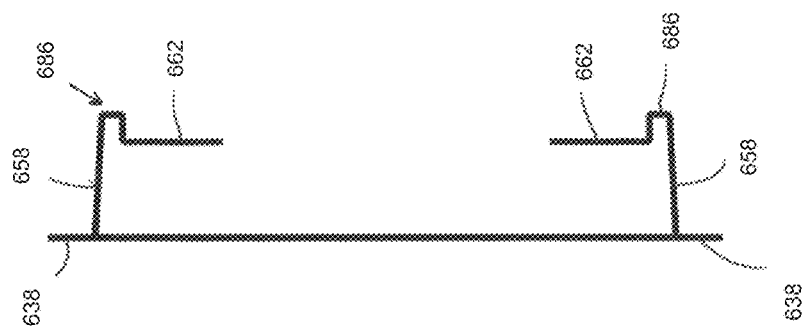
FIG. 31 is an end view of the bracket of FIG. 29.
Figure 30:
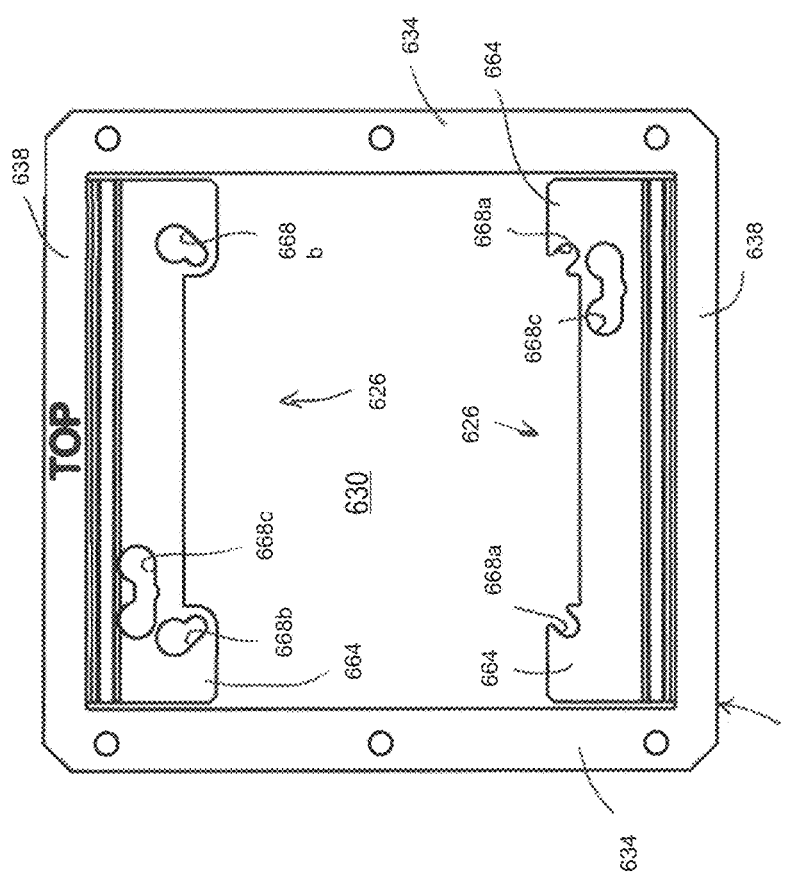
FIG. 30 is a plan view of the bracket of FIG. 29.
Figure 32:
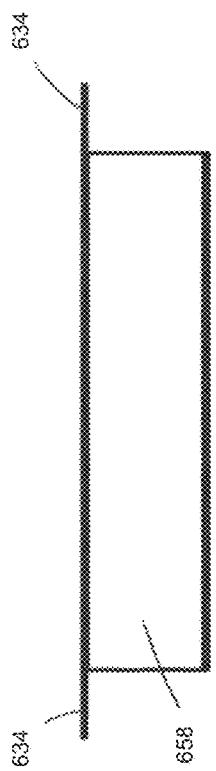
FIG. 32 is a side view of the bracket of FIG. 29.

As shown in FIGS. 29 and 30, the bracket 610 has a shorter length than the bracket 210 described above. The bracket 610 accommodates a single electrical box 70 (FIG. 34) and mud ring 72. Each second leg 662 includes tabs 664 extending into the opening 630. In addition, the second portion 626 includes mounting apertures 668 having various shapes. For example, the apertures 668 include opened ended slots 668*a* formed along edges of tabs 664 on one second portion 626 of the bracket 610, and keyhole slots 668*b* formed at an angle relative to tabs 664 on an opposite second portion 626 of the bracket 610. Additionally, joined mounting apertures 668*c* may be formed on each second leg 626 and may be formed as two key hole slots positioned in mirrored relationship in which the elongated slot portions are joined to one another.

Figure 33:
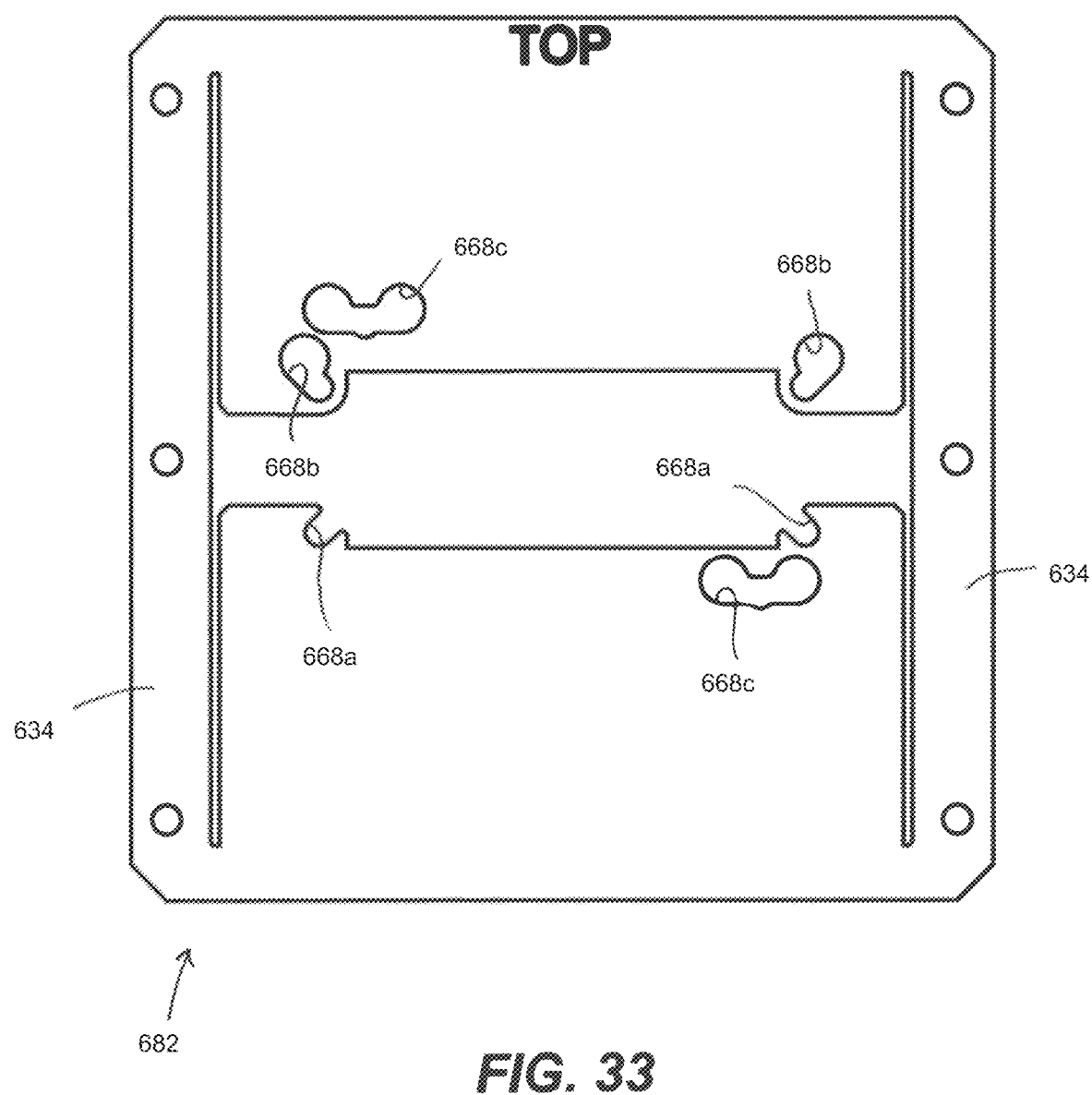
FIG. 33 is a plan view of a blank prior to forming the bracket of FIG. 29.

FIG. 33 shows a blank 682 before the bracket 610 is formed. The second portions 626 are initially formed coplanar with the flange 622 and are subsequently bent into the opening 630. Each second portion 626 is bent such that a second leg 626 is connected to a first leg 658 by a longitudinal channel 686 (FIG. 31) extending along the length of the second portion 626. The channel 686 provides additional rigidity and assists in locating the electrical boxes 70 (FIG. 34) and mud rings 72 along a lateral centerline of the bracket 610.

Figure 34:
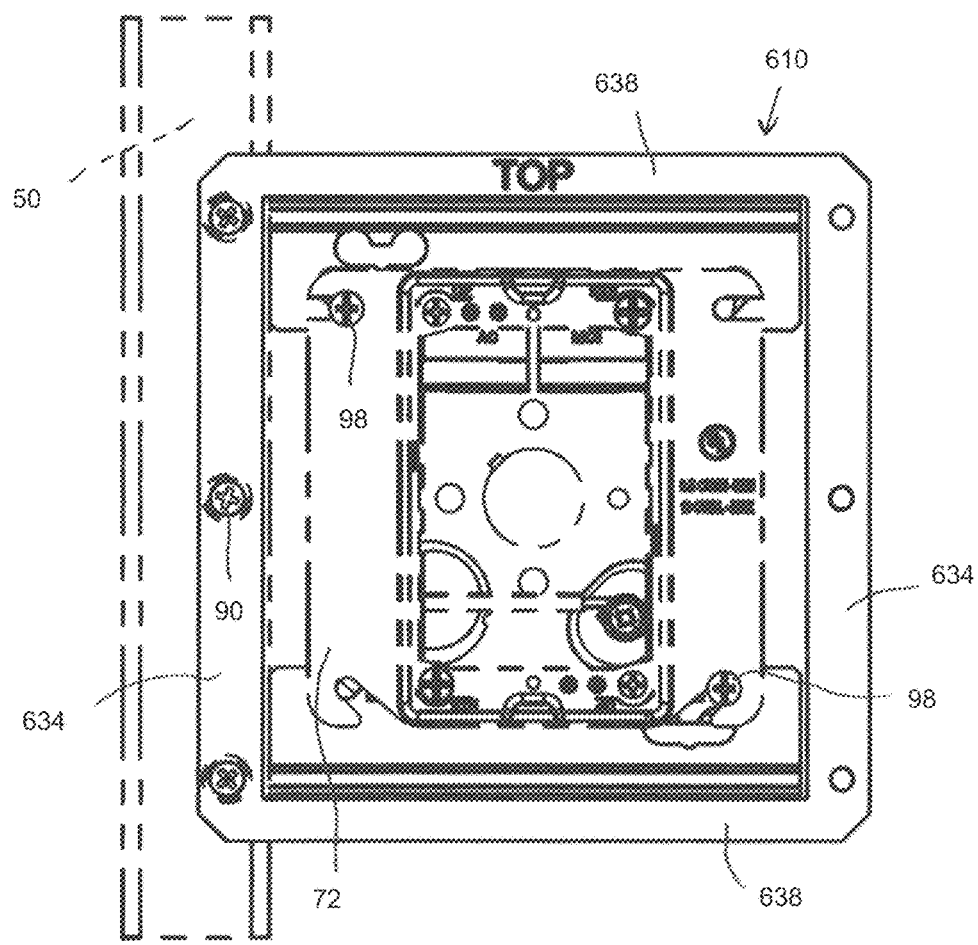
FIG. 34 is a plan view of the bracket of FIG. 29 supporting an electrical box and a mud ring.
Figure 35:
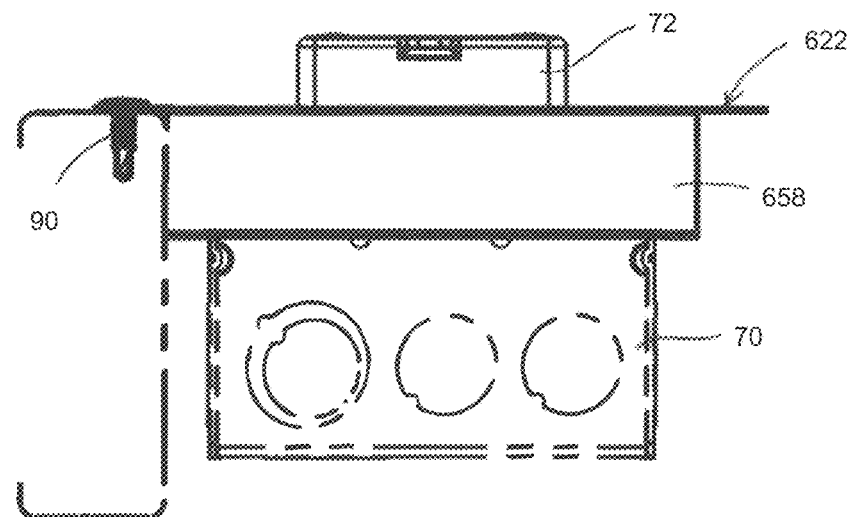
FIG. 35 is a top view of the bracket, electrical box, and mud ring of FIG. 34.
Figure 36:
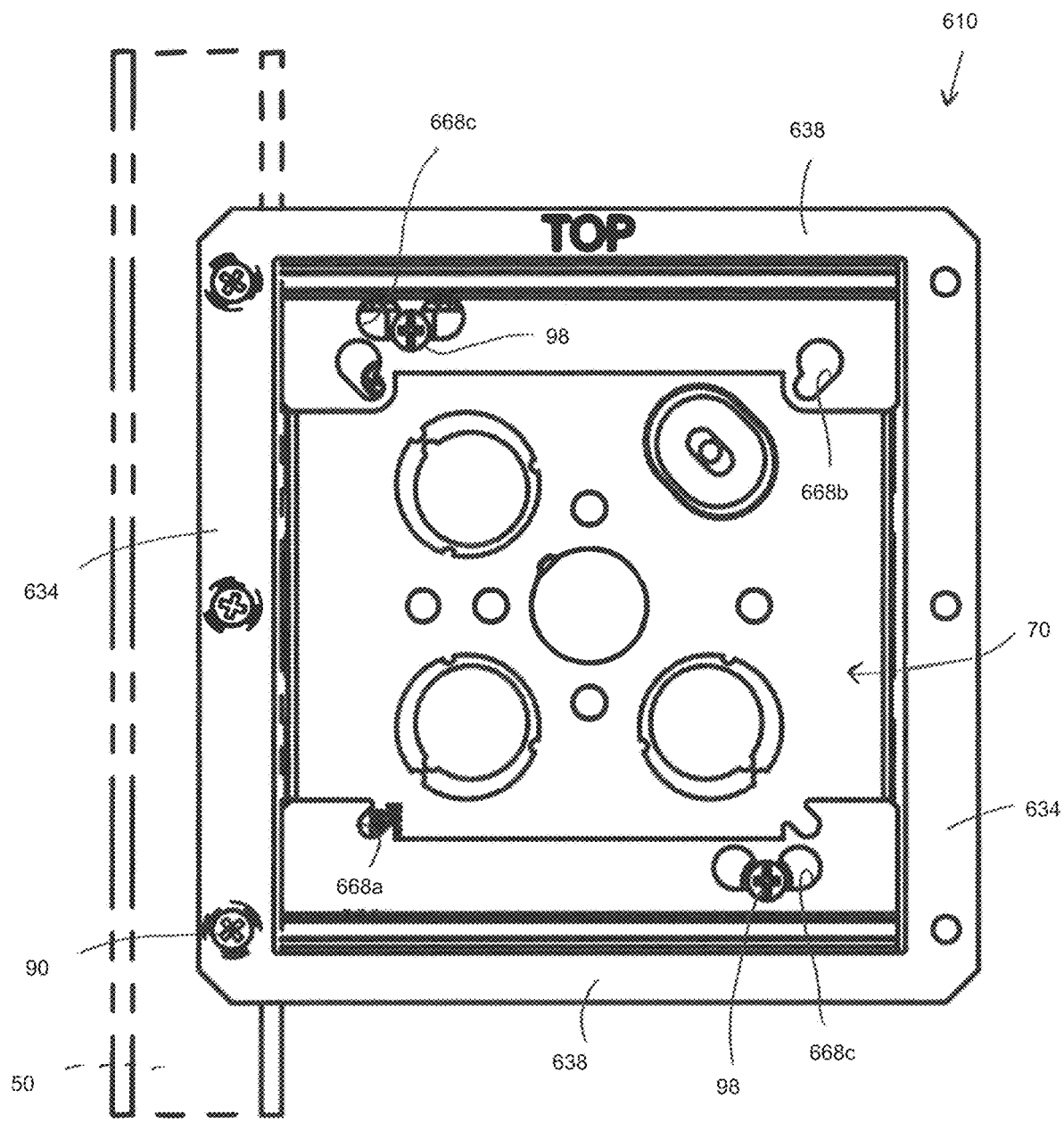
FIG. 36 is a plan view of the bracket of FIG. 29 supporting an electrical box.
Figure 37:
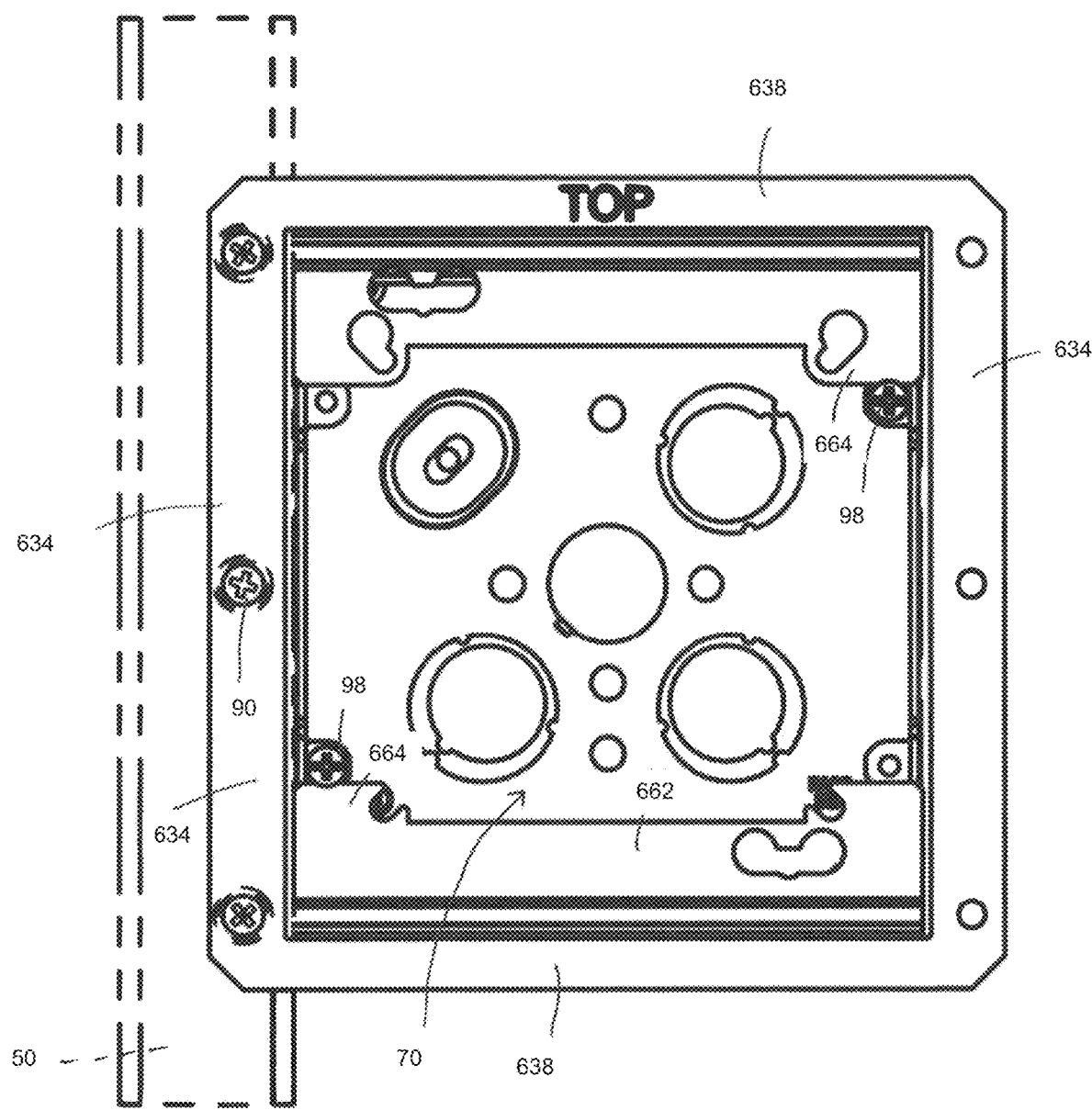
FIG. 37 is a plan view of the bracket of FIG. 29 supporting an electrical box.
Figure 38:
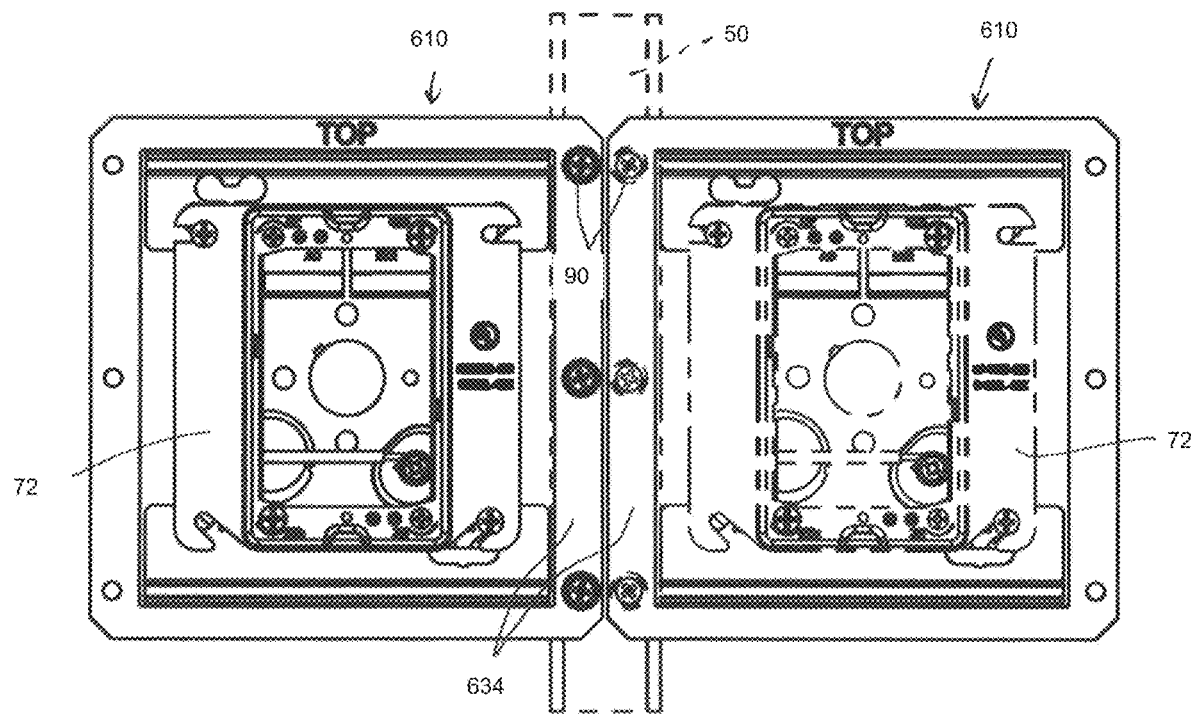
FIG. 38 is a plan view of a pair of brackets of FIG. 29 supported on a common stud and each supporting an electrical box and mud ring.
Figure 39:
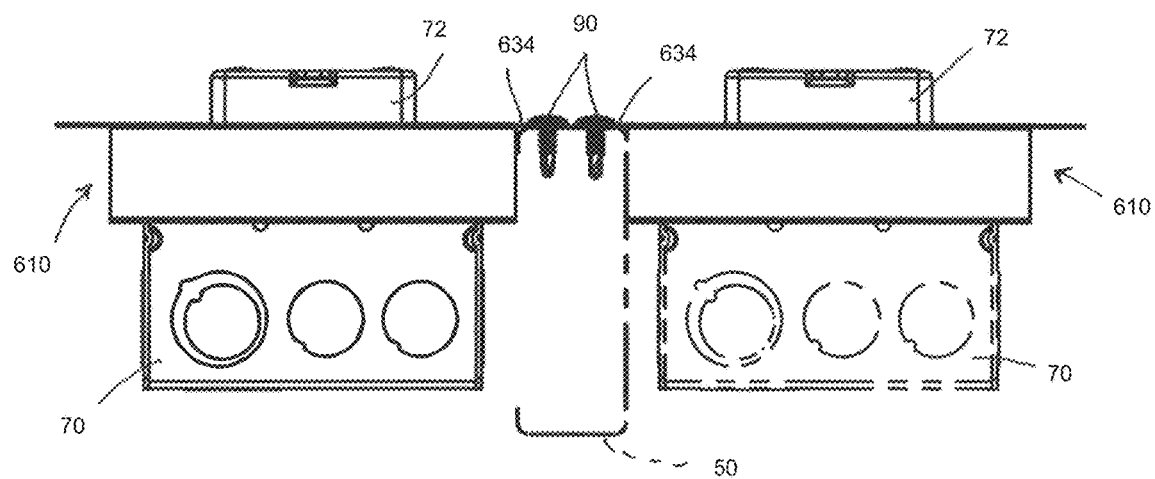
FIG. 39 is a top view of the pair of brackets, electrical boxes, mud rings, and stud of FIG. 38.

FIGS. 34 and 35 illustrate the bracket 610 coupled to a stud 50. An electrical box 70 and mud ring 72 is secured to the bracket 610. In the illustrated embodiment, the electrical box 70 is secured by fasteners 98 extending through apertures 668*a*, 668*b* formed on the tabs 664, and the mud rings 72 are secured via the same fasteners 98. FIG. 36 shows the electrical boxes 70 secured to the second portion 626 by fasteners 98 (e.g., screws) extending through the joined mounting apertures 668*c*. FIG. 37 shows the electrical boxes 70 secured to the second portions 626 by fasteners 98 (e.g., screws) extending through a center of the bracket 610. FIGS. 38 and 39 illustrate a pair of brackets 610 coupled to a common stud 50, with one bracket 610 positioned on each side of the stud 50.

The terms "first", "second", "third", "upper", "lower", and the like may be used herein to modify various elements. These modifiers do not imply a spatial, sequential, or hierarchical order to the modified elements unless specifically stated.

The embodiments described above and illustrated in the figures are presented by way of example only and are not intended as a limitation upon the concepts and principles presented herein. As such, it will be appreciated that variations and modifications exist within the scope and spirit of one or more independent aspects as described.

What is claimed is:

1. A bracket for supporting at least one electrical device, the bracket comprising:
   a first portion including a flange having an end portion and a pair of elongated support members extending laterally from the end portion, a central opening positioned between the support members, the end portion oriented in a first plane; and
   at least one second portion including a leg coupled to one of the support members in a cantilevered manner and positioned in the central opening, the leg providing a mounting surface oriented in a second plane substantially parallel to and offset from the first plane, the mounting surface configured to be coupled to the at least one electrical device.

2. The bracket of claim 1, wherein the end portion is a first end portion, further comprising a second end portion and defining a longitudinal axis extending between the first end portion and second end portion, the first end portion including at least one opening for coupling the first end portion to a support member, the second end portion including at least one opening for coupling the second end portion to another support member, wherein the first portion and the at least one second portion are positioned between the first end portion and the second end portion.

3. The bracket of claim 1, wherein the second portion includes a plurality of openings positioned on the mounting surface and spaced apart from one another along a longitudinal axis of the bracket.

4. The bracket of claim 1, wherein the second portion includes a pair of second portions, each of the second portions connected to an associated one of the support members on opposite sides of the central opening.

5. The bracket of claim 1, wherein each second portion further includes an intermediate portion connected between the leg and the flange, wherein a channel connects the intermediate portion to the leg.

6. The bracket of claim 1, wherein the flange includes a pair of bracket members, each bracket member including an end portion and a pair of side portions, the side portions of each bracket member end portion slidably engaging the side portions of the other bracket member to permit the end portions to move relative to one another along a longitudinal axis of the bracket.

7. The bracket of claim 1, wherein the second portion is configured to support multiple electrical devices along a length of the second portion.

8. The bracket of claim 1, wherein the second portion is configured to support at least one electrical device at multiple positions along a length of the second portion.

9. The bracket of claim 1, wherein a first side of the leg is configured to engage an electrical box and a second side of the leg opposite the first side is configured to engage a mud ring.

10. A bracket for supporting at least one electrical device, the bracket comprising:
a first portion including a flange including a pair of elongated support members extending between a first end and a second end, the flange defining a central opening positioned between the support members; and
at least one second portion including a leg connected to one of the support members, the leg positioned in the central opening and extending at least partially between the first end and the second end, the leg providing multiple positions at which the at least one electrical device can be supported.

11. The bracket of claim 10, wherein the second portion includes a plurality of openings positioned on the leg and spaced apart from one another along a longitudinal axis of the bracket.

12. The bracket of claim 10, wherein the at least one second portion includes a pair of second portions, each of the second portions connected to an associated one of the support members on opposite sides of the central opening.

13. The bracket of claim 10, wherein each second portion further includes an intermediate portion connected between the leg and the flange, wherein a channel connects the intermediate portion to the leg.

14. The bracket of claim 10, wherein the flange is formed as two mating sections, each section including a pair of side portions coupled to an end portion, the side portion of one of the sections mating with an associated side portion of the other section in a slidable manner to permit the sections to move relative to one another along a longitudinal axis of the bracket.

15. A bracket for supporting at least one electrical device between a first support member and a second support member, the bracket comprising:
a first end configured to be secured to a forward surface of the first support member;
a second end configured to be secured to a forward surface of the second support member, the bracket defining a longitudinal axis extending between the first end and the second end;
a first portion including a flange oriented in a first plane positioned proximate the forward surface of the first support member and the forward surface of the second support member, the first portion positioned between the first end and the second end; and
at least one second portion including a leg oriented in a second plane, the leg recessed relative to the first portion such that the second plane is substantially parallel to and offset from the first plane, the leg configured to be coupled to the at least one electrical device.

16. The bracket of claim 15, wherein the leg includes a plurality of openings spaced apart from one another along the longitudinal axis.

17. The bracket of claim 15, wherein the first portion defines a central opening, the flange including a first member extending along one side of the central opening between the first end and the second end, the flange further including a second member extending along another side of the central opening between the first end and the second end, wherein the second portion includes a pair of second portions, each of the second portions connected to one of the first member and the second member of the flange on opposite sides of the central opening.

18. The bracket of claim 15, wherein each second portion further includes an intermediate portion connected between the leg and the flange, wherein a channel connects the intermediate portion to the leg.

19. The bracket of claim 15, wherein the flange is formed as separable sections, each section including a pair of side members extending from one of the first end and the second end, the side members being slidably engageable with one another to permit the first end and the second end to move relative to one another in a telescoping manner in a direction parallel to the longitudinal axis.

20. The bracket of claim 15, wherein a first side of the leg is configured to engage an electrical box and a second side of the leg opposite the first side is configured to engage a mud ring.

* * * * *